(12) United States Patent
Braddock et al.

(10) Patent No.: US 11,064,844 B2
(45) Date of Patent: Jul. 20, 2021

(54) WATER MANAGEMENT SYSTEM AND METHOD FOR MANAGING WATER

(71) Applicant: MAAX BATH INC., Lachine (CA)

(72) Inventors: Charles Kerwin Braddock, Ellicott City, MD (US); Thomas Stuart Debaugh, Glen Rock, PA (US); Ashley Imsand, Huntersville, NC (US)

(73) Assignee: MAAX BATH INC., Lachine (CA)

( * ) Notice: Subject to any disclaimer, the term of this patent is extended or adjusted under 35 U.S.C. 154(b) by 98 days.

(21) Appl. No.: 16/211,466

(22) Filed: Dec. 6, 2018

(65) Prior Publication Data

US 2019/0104890 A1  Apr. 11, 2019

Related U.S. Application Data

(63) Continuation-in-part of application No. 15/611,870, filed on Jun. 2, 2017, and a continuation-in-part of (Continued)

(51) Int. Cl.

| | |
|---|---|
| *E03C 1/02* | (2006.01) |
| *A47K 3/00* | (2006.01) |
| *F16K 31/02* | (2006.01) |
| *G01K 1/14* | (2021.01) |
| *F16K 11/00* | (2006.01) |

(Continued)

(52) U.S. Cl.
CPC ............... *A47K 3/00* (2013.01); *E03C 1/04* (2013.01); *F16K 11/00* (2013.01); *F16K 31/02* (2013.01); *G01K 1/14* (2013.01); *G01K 1/143* (2013.01); *G01K 13/02* (2013.01); *E03B 1/04* (2013.01); *E03C 1/02* (2013.01); *E03C 1/05* (2013.01); *E03C 1/055* (2013.01); *E03C 1/057* (2013.01); *G01F 23/241* (2013.01); *G01K 13/026* (2021.01); *G01K 2207/00* (2013.01)

(58) Field of Classification Search
CPC ... E03C 1/04; E03C 1/05; E03C 1/057; E03C 1/055; E03C 1/02; F16K 31/02; F16K 11/00; E03B 1/04; G01K 13/02; G01K 1/14; G01K 1/143
See application file for complete search history.

(56) References Cited

U.S. PATENT DOCUMENTS

| | | | |
|---|---|---|---|
| 4,563,780 A | * | 1/1986 | Pollack ..................... E03B 7/04 4/668 |
| 4,685,158 A | | 8/1987 | Lively |

(Continued)

FOREIGN PATENT DOCUMENTS

| | | |
|---|---|---|
| CA | 2 265 374 A1 | 9/1999 |
| CN | 204826095 U | 12/2015 |

(Continued)

*Primary Examiner* — Matthew W Jellett
*Assistant Examiner* — Christopher D Ballman
(74) *Attorney, Agent, or Firm* — Bradley Arant Boult Cummings; Timothy L. Capria; Alexandra C. Lynn

(57) ABSTRACT

There is described an automated liquid management system for a liquid container such as a bathtub. The system comprises a faucet or a shower head, a drain closure, a level sensor and a controller operatively coupled to thereto. The controller operates the faucet or a shower head, the drain closure and the level sensor to monitor and control the level of liquid in the container.

20 Claims, 23 Drawing Sheets

Related U.S. Application Data application No. 15/611,863, filed on Jun. 2, 2017, now Pat. No. 10,385,555, application No. 16/211,466, which is a continuation-in-part of application No. 15/611,856, filed on Jun. 2, 2017, application No. 16/211,466, which is a continuation-in-part of application No. 15/610,670, filed on Jun. 1, 2017, now Pat. No. 10,227,761.

(60) Provisional application No. 62/345,466, filed on Jun. 3, 2016, provisional application No. 62/345,508, filed on Jun. 3, 2016, provisional application No. 62/345,493, filed on Jun. 3, 2016, provisional application No. 62/344,021, filed on Jun. 1, 2016.

(51) Int. Cl.
  *E03C 1/04* (2006.01)
  *G01K 13/02* (2021.01)
  *G01K 1/143* (2021.01)
  *G01F 23/24* (2006.01)
  *E03C 1/05* (2006.01)
  *E03B 1/04* (2006.01)

(56) References Cited

U.S. PATENT DOCUMENTS

| | | | |
|---|---|---|---|
| 4,716,605 A * | 1/1988 | Shepherd | A61H 33/0087 4/541.2 |
| 4,742,456 A * | 5/1988 | Kamena | G05D 23/1393 340/12.32 |
| 4,823,414 A * | 4/1989 | Piersimoni | E03C 1/057 137/624.11 |
| 4,869,287 A * | 9/1989 | Pepper | E03C 1/057 137/391 |
| 4,870,986 A * | 10/1989 | Barrett | G05D 23/1393 137/119.1 |
| 5,040,106 A * | 8/1991 | Maag | B67D 7/303 141/192 |
| 5,058,804 A * | 10/1991 | Yonekubo | E03C 1/04 236/12.12 |
| 5,206,963 A * | 5/1993 | Wiens | E03C 1/00 4/597 |
| 5,414,879 A * | 5/1995 | Hiraishi | G05D 23/1393 4/601 |
| 5,694,653 A * | 12/1997 | Harald | E03C 1/057 4/559 |
| 5,855,356 A | 1/1999 | Fait | |
| 5,975,124 A * | 11/1999 | Stevens, II | E03C 1/05 134/113 |
| 6,250,601 B1 * | 6/2001 | Kolar | G01S 13/88 251/129.04 |
| 6,705,534 B1 * | 3/2004 | Mueller | G05D 23/1393 236/12.12 |
| 6,772,705 B2 | 8/2004 | Leonard | B63G 8/24 114/333 |
| 6,953,913 B1 * | 10/2005 | Hara | A47J 36/321 219/432 |
| 6,962,162 B2 * | 11/2005 | Acker | E03B 7/04 137/1 |
| 7,584,898 B2 * | 9/2009 | Schmitt | E03C 1/05 137/359 |
| 8,146,181 B2 | 4/2012 | Gaus | |
| 8,418,993 B2 * | 4/2013 | Chen | E03C 1/057 251/129.04 |
| 8,572,772 B2 * | 11/2013 | Wolf | E03C 1/057 4/623 |
| 9,057,183 B2 * | 6/2015 | Chen | E03C 1/057 |
| 9,157,219 B2 * | 10/2015 | Gibson | E03C 1/055 |
| 9,163,972 B2 * | 10/2015 | Veros | G01F 23/263 |
| 9,194,110 B2 * | 11/2015 | Frick | E03C 1/04 |
| 9,285,807 B2 * | 3/2016 | Rodenbeck | E03C 1/057 |
| 9,347,207 B2 * | 5/2016 | Chen | E03C 1/057 |
| 9,464,414 B2 * | 10/2016 | Shapira | E03C 1/04 |
| 9,624,655 B2 * | 4/2017 | Gregory | E03C 1/057 |
| 9,777,470 B2 * | 10/2017 | Mazz | E03C 1/055 |
| 9,783,964 B2 | 10/2017 | Thompson et al. | |
| 9,945,103 B2 | 4/2018 | Thompson et al. | |
| 9,988,797 B2 * | 6/2018 | Reeder | E03C 1/055 |
| 10,519,642 B2 * | 12/2019 | Main | E03D 3/06 |
| 2002/0007510 A1 * | 1/2002 | Mann | E03C 1/057 4/300 |
| 2002/0047784 A1 | 4/2002 | Dunnett | |
| 2004/0056779 A1 * | 3/2004 | Rast | B63B 22/16 340/985 |
| 2005/0060796 A1 | 3/2005 | Cho | |
| 2005/0159275 A1 * | 7/2005 | Bullman | A63B 69/0035 482/111 |
| 2005/0251906 A1 * | 11/2005 | Scott | E03C 1/05 4/668 |
| 2006/0138246 A1 * | 6/2006 | Stowe | G05D 23/1393 236/12.12 |
| 2007/0152074 A1 * | 7/2007 | Stowe | G05D 23/1393 236/12.1 |
| 2008/0163416 A1 | 7/2008 | Go | |
| 2008/0271238 A1 * | 11/2008 | Reeder | A46B 7/04 4/597 |
| 2009/0050209 A1 | 2/2009 | Rautavuori et al. | |
| 2009/0178192 A1 | 7/2009 | Vassilev | |
| 2009/0224930 A1 * | 9/2009 | Burza | G01F 23/68 340/618 |
| 2010/0052920 A1 * | 3/2010 | Roach | G08B 21/182 340/618 |
| 2010/0108165 A1 * | 5/2010 | Rodenbeck | E03C 1/057 137/801 |
| 2011/0178644 A1 * | 7/2011 | Picton | E03B 7/071 700/282 |
| 2012/0266973 A1 * | 10/2012 | Gray | E03C 1/055 137/334 |
| 2012/0318386 A1 | 12/2012 | Guzman | |
| 2013/0081713 A1 * | 4/2013 | Hsu | E03C 1/055 137/468 |
| 2015/0276075 A1 | 10/2015 | Davies | |
| 2015/0276265 A1 * | 10/2015 | Davari | H04L 12/2818 700/300 |
| 2016/0077530 A1 * | 3/2016 | Moran | F16K 31/02 700/282 |
| 2016/0129464 A1 * | 5/2016 | Frommer | G05D 7/0635 700/282 |
| 2016/0144383 A1 * | 5/2016 | Pang | G05B 15/02 700/283 |
| 2016/0258144 A1 | 9/2016 | Tayenaka et al. | |

FOREIGN PATENT DOCUMENTS

| | | |
|---|---|---|
| EP | 2 918 739 B1 | 9/2018 |
| JP | 2008-008124 A | 1/2008 |

* cited by examiner

WATER MANAGEMENT SYSTEM AND METHOD FOR MANAGING WATER

RELATED APPLICATIONS

This application is a continuation-in-part application of U.S. application Ser. No. 15/611,856, filed on Jun. 2, 2017, which claims the benefit of U.S. Provisional Application No. 62/345,466, filed on Jun. 3, 2016; Ser. No. 15/611,870, filed on Jun. 2, 2017, which claims the benefit of U.S. Provisional Application No. 62/345,493, filed on Jun. 3, 2016; Ser. No. 15/611,863, filed on Jun. 2, 2017, which claims the benefit of U.S. Provisional Application No. 62/345,508, filed on Jun. 3, 2016; and Ser. No. 15/610,670, filed on Jun. 1, 2017, which claims the benefit of U.S. Provisional Application No. 62/344,021, filed on Jun. 1, 2016, each of which are hereby incorporated by reference.

TECHNICAL FIELD

The present invention relates to the field of water management systems, and more particularly to automated water management systems.

BACKGROUND

Usually home automation is directed to the control and automation of lighting, heating, ventilation, air conditioning (HVAC), appliances, and security. However, no automation systems presently exist for the automation of water delivery systems such as bathtubs or showers.

An automated bathtub or shower can be controlled so that the bathtub or shower may be automatically filled or supplied with water. For example, an automatic bathtub may be remotely controlled by a user in order to fill the bathtub with water. In order to create automated bathtubs or showers, electronic components such as automated water delivery system (e.g. an electronic faucet or shower head) and electronic drains are required.

An automated water delivery system may be remotely controlled to remotely control the flow of water. Therefore, electrical power must be provided to the automated water delivery system. Connecting the automated water delivery system to the power grid may require construction work such as removing the bathtub or making holes in a wall to electrically connect the automated water delivery system to the power grid, which is time-consuming and expensive.

An electronic drain comprises an electronic drain closure system that is remotely controlled for selectively opening and closing of the drain. An electronic drain closure system usually comprises a motor connected to a power source and a controller for controlling the motor in order to selectively close and open the drain. However, installing an electronic drain usually requires a technician or a plumber to have access to the bottom of the bathtub in order to electrically connect the electronic drain to a power source, which is both time and cost consuming.

Furthermore, in order to provide automated liquid delivery systems such as automated bathtubs, the control of the level of water within the container is important in order to avoid overflow. While some containers such as bathtubs are usually provided with an overflow aperture connected to an overflow drain for evacuating water when the level of water within the bathtub reaches a predefined height, such an overflow system may not be efficient to avoid overflows.

Therefore, there is a need for an automated management system for simultaneously controlling a water delivery system, a drain closure and an overflow system which overcomes at least some of the above identified drawbacks.

SUMMARY

According to one broad aspect, there is provided an automated liquid management system for a liquid container. In this broad aspect, the automated liquid management system comprises:
  an electronic liquid delivery system positioned to deliver a liquid to the container, the electronic liquid delivery system including a mixing valve connected to a source of hot liquid and a source of cold liquid and a flow control valve connected to the mixing valve, the flow control valve controlling a flow of liquid coming from the mixing valve;
  a drain closure device;
  a level sensor for monitoring a level of liquid in the container; and
  a controller operatively coupled to the electronic liquid delivery system, the drain closure device and the level sensor, the controller comprising a processing unit, a communication unit for communicating with the electronic liquid delivery system, the drain closure device and the level sensor, and a memory, the memory having statements and instructions stored on that upon execution by the processing unit performs the steps of:
    receiving a desired temperature for the liquid to be delivered to the container and a desired level of liquid within the container;
    adjusting the mixing valve connected to the source of hot liquid and the source of cold liquid to obtain the desired temperature;
    operating the flow control valve for delivering the liquid having the desired temperature;
    closing the drain closure device;
    monitoring the level of the liquid within the container; and
    closing the flow control valve of the electronic liquid delivery system when the monitored level of liquid substantially corresponds to the desired level of liquid.

In one feature, the automated liquid management system further comprises a temperature sensor, the controller being operatively coupled to the temperature sensor, the communication unit further communicating with the temperature sensor, the controller being further configured for monitoring a temperature of the liquid contained within the container.

In another feature, the automated liquid management, at least one of the electronic liquid delivery system, the drain closure device, the level sensor, the temperature sensor and the controller is powered by a battery. Preferably, the battery is a rechargeable battery. More preferably, the automated liquid management system further comprises a solar panel for charging the rechargeable battery.

In yet another feature, the communication unit is a wireless communication unit.

In still another feature, the electronic liquid delivery system comprises:
  a housing defining an internal chamber, the housing comprising at least one delivery hole, the mixing valve, the flow control valve and the controller being inserted into the internal chamber;
  at least one pipe inserted into the internal chamber and connected to the flow control valve for delivering the liquid coming from the flow control valve through the delivery hole of the housing; and a cover securable to the housing for enclosing the flow control valve, the pipe, the controller therein.

In another feature, the automated liquid management system further comprises an activation key for activating the flow control valve. Preferably, the activation key comprises one of a press button and a motion sensor.

In another feature, the automated liquid management system further comprises a first temperature sensor for monitoring a temperature of the liquid to be delivered by the pipe.

In another feature, the automated liquid management system further comprises a flow meter for monitoring a flow rate of the liquid.

In another feature, the contactless level sensor comprises an ultrasonic level sensor.

In another feature, the contactless temperature sensor comprises an infrared temperature sensor.

In one feature, the electronic liquid delivery system comprises at least one of an electronic faucet and an electronic shower head.

In another feature, the drain closure device comprises:

a drain fitting securable to an opening present in the container for containing a liquid and to an evacuation drain for evacuating the liquid to be contained in the container; and a closure member movably connected to the drain fitting for selectively opening and closing the drain fitting, the closure member including:

a casing;

a motion device for selectively moving the casing relative to the drain fitting between an open position in which the casing is away from the drain fitting to allow the liquid from flowing from the container into the evacuation drain and a closed position in which the casing abuts against the drain fitting to prevent the liquid from flowing from the container into the evacuation drain;

an electrical motor received in the casing for activating the motion device;

a communication unit received in the casing and operatively coupled to the communication unit of the controller for at least receiving a command indicative of one of an opening of the electronic drain closure system and a closure of the electronic drain closure system; and a controller for activating the electrical motor in accordance with the command received by the communication unit of the closure member.

Preferably, the electronic drain closure system further comprises a battery received in the casing for powering at least the electrical motor and the controller. More preferably, the battery is a rechargeable battery. Even more preferably, the electronic drain closure system further comprises a solar panel installed on the casing for recharging the rechargeable battery.

In one feature, the electronic drain closure system further comprises a liquid sensor for detecting a presence of the liquid adjacent the closure member; wherein the controller is further configured for activating the communication unit when the sensor detects the presence of the liquid and deactivating the communication unit when the sensor detects an absence of liquid. Preferably, the liquid sensor is secured to the closure member.

In one feature, the motion device comprises a drive screw rotatably secured to the casing, a rotation of the drive screw triggering motion of the casing.

In another feature, the drain fitting comprises a first tubular body extending between a first top end and a first bottom end and a first bottom wall secured at the first bottom end of the first tubular body, the first top end being securable to the container and the first bottom end being securable to the evacuation drain, the first bottom wall comprising at least one evacuation aperture for allowing the liquid to flow therethrough and a first threaded hole for receiving the drive screw.

In still another feature, the drain fitting further comprises a flange projecting from the first top end of the first tubular body.

In yet another feature, the first tubular body comprises at least one first recess extending on an inner face thereof along at least a section of a length thereof. More preferably, the electronic drain closure system further comprises a coupling member insertable into the first tubular body of the drain fitting, the coupling member comprising a second tubular body extending between a second top end and a second bottom end, the coupling member further comprising a second bottom wall secured at the second bottom end and comprising a second threaded hole for receiving therein the drive screw.

In another feature, the coupling member further comprises at least first protrusion each receivable into a respective one of the at least one first recess for preventing a rotation of the coupling member relative to the drain fitting.

In still another feature, the coupling member is fixedly secured to the drain fitting.

In another feature, the coupling member is removably secured to the drain fitting.

In another feature, the drain fitting further comprises at least one first magnet and the coupling member further comprises at least one second magnet, each one of the at least one first magnet interacting with a respective one of the at least one second magnet for removably securing the coupling member into the drain fitting.

In another feature, the second tubular body further comprises at least one second recess on an internal face thereof extending along at least a section of a length thereof.

In another feature, the casing comprises a hollow T-shaped body comprising a bottom portion and a top portion and a third bottom wall located at a bottom of the hollow T-shaped body, the third bottom wall being provided with a screw receiving aperture through which the drive screw extends, the electrical motor being inserted into the bottom portion.

In another feature, the bottom portion of the hollow T-shaped body comprises at least one second protrusion projecting from an external face thereof, each one of the at least one second protrusion being received into a respective one of the at least one second recess.

In another feature, the electronic drain closure system further comprises a gasket surrounding the bottom portion of the closure member for substantially hermetically close the drain fitting when the closure member is in the closed position.

In another feature, the electronic drain closure system further comprises a cover for covering the hollow T-shaped body.

In another feature, at least one of the level sensor and the temperature sensor is mounted to the electronic liquid delivery system.

In another feature, at least one of the level sensor and the temperature sensor is a contactless sensor.

In another feature, the level sensor comprises:
  a body extending along a longitudinal axis, the body being insertable within the container; and
  a level sensor unit secured to the body for detecting the level of the liquid along the longitudinal axis of the body.

In another feature, the level sensor further comprises the temperature sensor secured to the body for measuring a temperature of the liquid. Preferably, the level sensor comprises at least one liquid sensor each positioned at a respective position along the longitudinal axis, each respective position corresponding to a different level of liquid and each liquid sensor for detecting a presence of the liquid.

In another feature, the level sensor comprises at least one current source, an electrical circuit and at least one current sensor for measuring at least one current intensity, the electrical circuit comprising at least one input electrical conductor and at least one output electrical conductor, each input electrical conductor being inserted into the body, having a first terminal connected to the at least one current source and a second terminal emerging from the body at one of the respective positions along the longitudinal axis, at least one section of the output electrical conductor emerging body each adjacent to the second terminal of a respective one of the at least one input electrical conductor.

Preferably, each second terminal and at least one output electrical conductor form together a respective electrical switch that is open when no liquid is present between the second terminal and the at least one output electrical conductor and that is closed when liquid is present between the second terminal and the at least one output electrical conductor.

More preferably, the level sensor further comprises a control unit for determining the level of liquid using a current intensity measured by the at least one current sensor.

Even more preferably, the at least one output electrical conductor comprises a single electrical conductor and the at least one current sensor comprises a single current sensor.

In a further feature, the control unit is adapted to compare a current intensity measured by the single current sensor to one of at least one predefined intensity and at least one predefined intensity range, and determine the level of liquid based on the comparison.

In yet a further feature, the controller is adapted to transmit a signal indicative of the determined level of liquid via the communication unit.

In still a further feature, the controller is adapted to trigger one of an alert and an alarm upon determining that the determined level of liquid corresponds to a reference level of liquid. Preferably, the reference level of liquid corresponds to an overflow level of liquid.

In another feature, upon determining that the determined level of liquid corresponds to the overflow level of liquid, the controller is adapted to transmit at least one of a first command indicative of a closure for an electronic faucet and a second command indicative of an opening for an electronic drain closure system.

In still another feature, the body is securable to a wall of the container. Preferably, the body comprises an overflow plate securable over an overflow aperture present in the wall of the container, and the level sensor is preferably secured to a rear face of the overflow plate.

In another feature, the body is securable to a faucet secured to the container.

In yet another feature, the controller is further configured for opening the drain closure device of the container and opening the flow control valve to add liquid when the monitored temperature does not correspond to the desired temperature.

In a further feature, the controller is further configured for opening the flow control valve to add hot liquid when the measured temperature is less than the desired temperature.

In yet a further feature, the controller is further configured for opening the flow control valve to add cold liquid when the measured temperature is greater than the desired temperature.

In one feature, the container is a bathtub.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
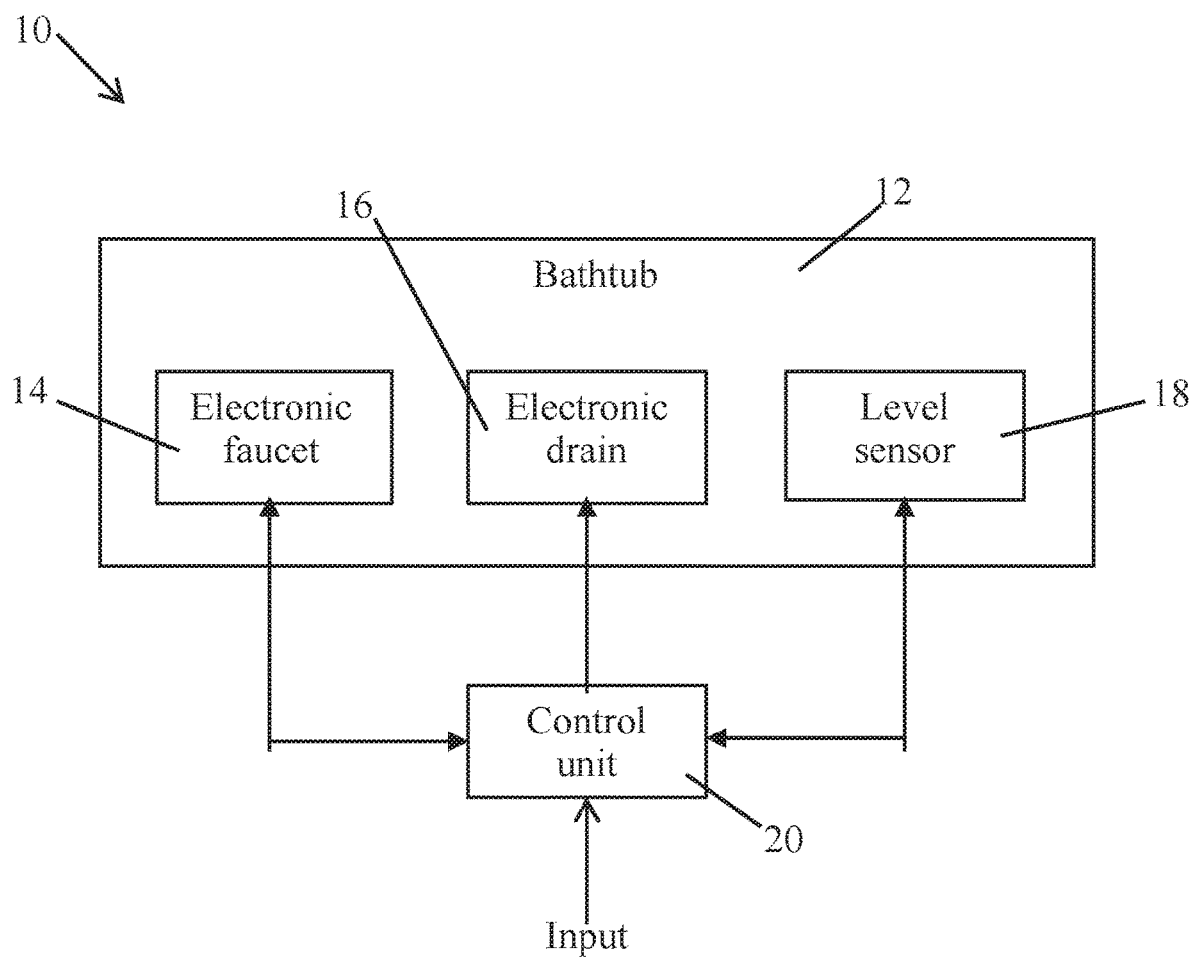
FIG. 1 is a block diagram illustrating an automated water delivery system, in accordance with an embodiment.

FIG. 1 illustrates an automated water delivery system 10 comprising at least a bathtub 12, an electronic faucet 14, an electronic drain closure device 16, a level sensor 17, and a controller or control unit 20. The electronic faucet 14 is positioned so as to deliver water to the bathtub 12. For example, the electronic faucet 14 may be secured to the bathtub 12 and connected to a source of water. The electronic faucet 14 may be connected to both a source of hot water and a source of cold water and comprise a mixing valve for mixing both hot and cold water together.

Electronic Faucet

The electronic faucet 14 is a faucet that can automatically deliver water without any human intervention. The operation of the electronic faucet 14 is controlled by a controller such as controller 20. The electronic faucet 14 may comprise a valve such as a solenoid valve for controlling fluid flow. The electronic faucet 14 may also comprise a mixing valve for controlling the flows of hot and cold water. The electronic faucet 14 may have a temperature sensor integrated therein, such as integrated into the valve, for sensing the temperature of the water to be delivered by the electronic faucet, as it will become apparent below.

Figure 2:
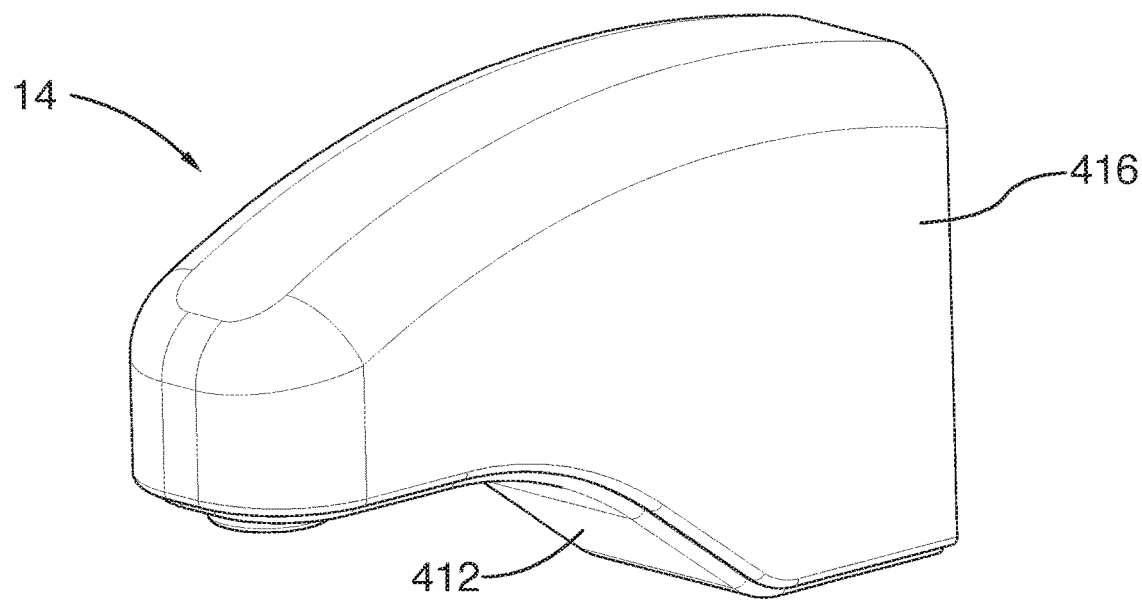
FIG. 2 is a perspective view of an electronic faucet comprising a cover, in accordance with a first embodiment.
Figure 3:
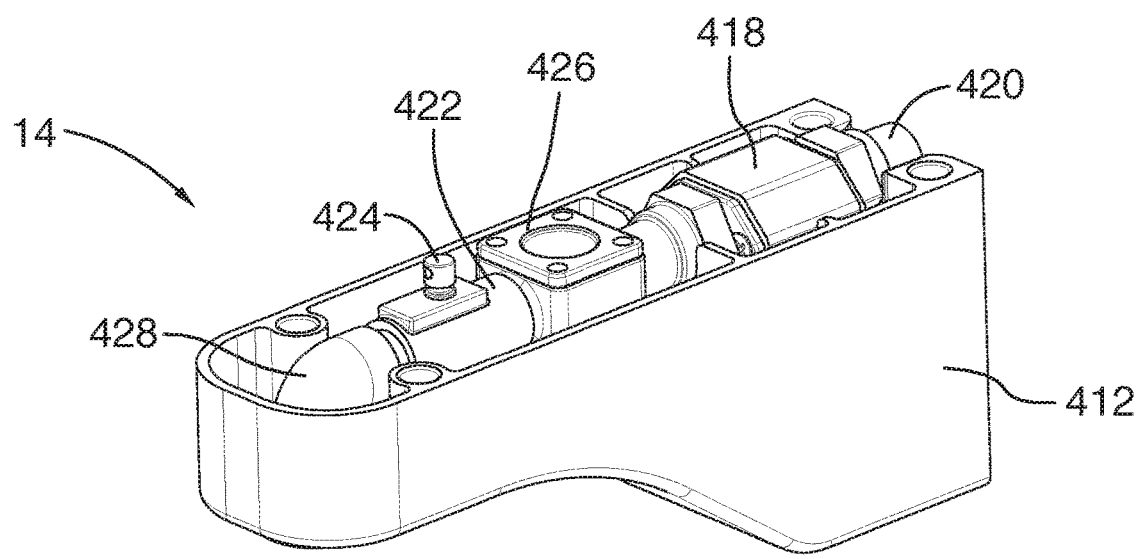
FIG. 3 is a perspective view of the electronic faucet of FIG. 2 with the cover omitted, in accordance with an embodiment.
Figure 4:
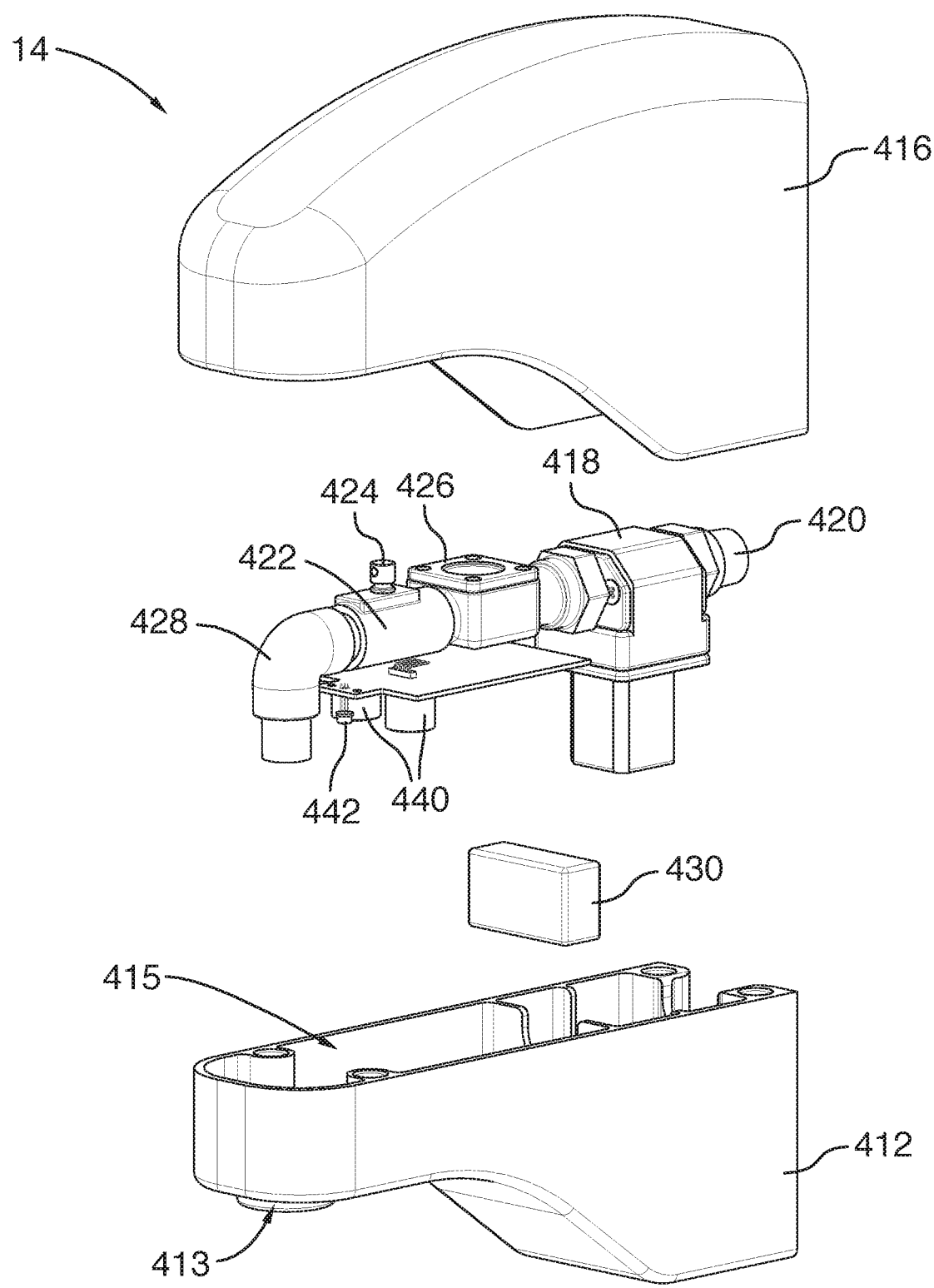
FIG. 4 is an exploded view of the electronic faucet of FIG. 2, in accordance with an embodiment.
Figure 5:
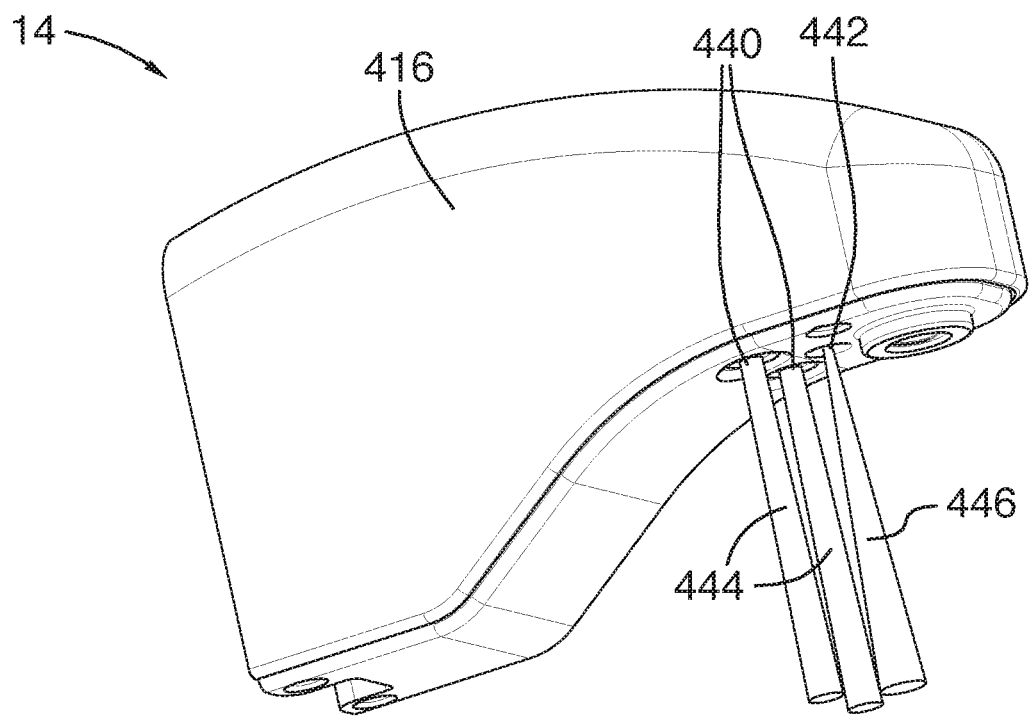
FIG. 5 is a perspective view of an electronic faucet provided with a level sensor and a contactless temperature sensor, in accordance with a second embodiment.

In accordance with one embodiment, referring to FIGS. 2 to 4, there is illustrated an electronic faucet 14 that may be used in connection with the bathtub 12, a sink, or the like. The electronic faucet 14 comprises a housing 412 defining an internal chamber 414 and a cover 416 that is removably securable to the housing 412. The housing 412 and the cover 416 are shaped so that the housing with the cover secured thereto has the shape of a faucet.

The electronic faucet 14 further comprises a flow control valve for receiving water from a source of water and controlling the flow of water to be delivered by the electronic faucet. The input of the flow control valve 418 is fluidly connected to a first pipe 420 in which water flows from the source of water. The output of the flow control valve 418 is fluidly connected to the input of a second pipe 422. A temperature sensor 424 such as a thermistor is secured to the outer surface of the pipe 422 in order to measure the temperature of the water flowing into the pipe 422. The output of the second pipe 422 is fluidly connected to the input of a flow meter 426 that is adapted to monitor the flow of the water flowing therethrough. The output of the flow meter 426 is fluidly connected to a water delivery pipe 428 which may have a curved shape as illustrated in FIG. 4. The water is delivered via the output of the pipe 428. It should be understood that the housing 412 comprises a water delivery hole 413 on its bottom face to allow the water delivered by the pipe 428 to fall into the bathtub 12. In one embodiment, the output of the pipe 428 is inserted into the water delivery hole.

The electronic faucet 14 further comprises a battery 430 and a controller (not shown). The battery 430 is used for powering at least the controller and the flow control valve 418. The battery may also be used for powering other components such as temperature sensors, flow rate sensors, etc.

In one embodiment, the battery 430 is a rechargeable battery.

As illustrated in FIG. 3, the internal chamber 415 may extend from the top of the housing 412 and the cover 416 is then securable on the top of the housing 412 as illustrated in FIG. 2. The flow control valve 418, the second pipe 422, the temperature sensor 424, the flow meter 426, the pipe 428, and the battery 430 are received within the internal chamber 414 of the housing 412.

In one embodiment, the flow control valve 418 is directly connected to a single source of water. In this case, the temperature sensor 424 may be omitted.

In another embodiment, the flow control valve 418 is fluidly connected to a mixing valve that is fluidly connected to a source of hot water and a source of cold water. The controller may be adapted to control the operation of the mixing valve in order to control the temperature of the water to be delivered by the electronic faucet 14.

In a further embodiment, the flow control valve 418 may be a mixing valve fluidly connected to both a source of hot water and a source of cold water. In this case, the controller is adapted to control the flow control valve 418 to adjust the flow of hot water and the flow of cold water flowing therethrough and adjust the temperature of the water delivered by the electronic faucet 14.

In one embodiment, the electronic faucet 14 further comprises a communication unit such as a wireless communication unit for receiving commands for the activation of the electronic faucet. For example, the electronic faucet 14 may be remotely controlled by a user using a remote control such as a mobile device. In this case, when the user inputs a command for opening the electronic faucet 14, the remote control sends a command indicative of the opening for the electronic faucet to the electronic faucet 14. The controller of the electronic faucet 14 receives the command via the communication unit and opens the flow control valve according to the received command to deliver water. Similarly, when the user inputs a command for closing the electronic faucet 14, the remote control sends a command indicative of the closing for the electronic faucet to the electronic faucet 14. The controller of the electronic faucet 14 receives the command via the communication unit and closes the flow control valve according to the received command to deliver water.

In an embodiment in which the electronic faucet 14 comprises a temperature sensor 424, the controller may be adapted to receive the measured temperature of the water flowing into the pipe 422 from the temperature sensor 424 and transmit the measured temperature via the communication unit.

In an embodiment in which the electronic faucet comprises a flow meter 426, the controller may be adapted to receive the flow of the water measured by the flow meter 426 and transmit the measured flow via the communication unit.

In an embodiment in which the electronic faucet 14 comprises a temperature sensor 424, the controller may be adapted to receive from a remote control a desired temperature for the water to be delivered via the communication unit. In this case, the controller may be adapted to adjust the flows of hot and cold water by controlling the mixing valve so that the temperature measured by the temperature sensor 424 substantially corresponds to the temperature desired by the user.

In one embodiment, the electronic faucet 14 comprises no temperature sensor 424 and the controller comprises a database containing mixing valve setting conditions for different water temperatures. In this case, upon receiving a desired temperature for the water, the controller retrieves from the database the mixing valve setting conditions that correspond to the received desired temperature and applies the retrieved mixing valve setting conditions to the mixing valve in order to obtain water having the desired temperature.

In another embodiment in which the faucet 14 is provided with the temperature sensor 424, the controller may apply a feedback loop control method to obtain the desired temperature. In this case, the controller receives the temperature measured by the temperature sensor 424 and adjusts the mixing valve setting conditions until the desired temperature is obtained.

In the same or another embodiment in which the electronic faucet 14 comprises a flow meter for measuring water flow rates, the controller may be adapted to receive from a remote control a desired flow for the water to be delivered via the communication unit. In this case, the controller may be adapted to adjust the flow of water by controlling the control flow valve 418 so that the flow measured by the temperature sensor 424 substantially corresponds to the received desired flow.

In another embodiment, the electronic faucet 14 may be provided with an activation device for opening and closing the faucet 14. For example, the electronic faucet may be provided with an activation key such as a press button for opening and closing the electronic faucet. In another example, the activation device may be a motion sensor.

In one embodiment, the electronic faucet 14 further comprises a level sensor such as a contactless level sensor for measuring the level of water in the container with which the electronic faucet 14 is used. For example, the electronic faucet 14 may comprise a dual ultrasonic sensor 440 adapted to measure the distance between the water within the bathtub 12 and the sensor 440. The dual ultrasonic sensor 440 is adapted to emit two ultrasound wave beams 444 which reflected by the surface of the liquid, e.g. water, and to detect the reflected ultrasound wave beams to measure the distance between the surface of the liquid and the dual ultrasonic sensor 440. The controller may then determine the level of liquid within the container or the volume of liquid in the container using from the measured distance between the surface of the liquid and the dual ultrasonic sensor 440.

In one embodiment the controller is adapted to receive a command indicative of a desired level of water within the bathtub 12. In this case, the controller is adapted to receive the measured level of water from the level sensor 440 close the control flow valve 418 when it determines that the measured level substantially corresponds to the desired level.

In the same or another embodiment, the electronic faucet further comprises a contactless temperature sensor 442 for remotely measuring the temperature of the liquid contained in the container. For example, the contactless temperature sensor may be an infrared temperature sensor 442. The infrared temperature sensor 442 is adapted to emit a beam 446 of infrared light which is reflected by the surface of the liquid contained in the container, and to detect the reflected light beam to measure the temperature of the liquid.

In one embodiment, the controller is adapted to receive a command indicative of a desired temperature for the water in the bathtub 12 and the measured temperature from the contactless temperature sensor 442. The controller then compares the measured temperature to the desired temperature and controls the mixing valve to add water having an adequate temperature until the measured temperature substantially corresponds to the desired temperature. If the measured temperature is less than the desired temperature, the controller is adapted to control the mixing valve so as to add hot water. If the measured temperature is greater than the desired temperature, the controller is adapted to control the mixing valve so as to add cold water.

It should be understood that the contactless level sensor 440 and the contactless temperature sensor 442 may be positioned at any adequate location on the housing 412 of the electronic faucet 14 as long as they can sense the water contained in the bathtub 12. In the illustrated embodiment the housing comprises holes on its wall that faces the bottom of the bathtub once installed, adjacent to the output of the pipe 428. As a result, the contactless level sensor 440 and the contactless temperature sensor 442 face the bottom of the bathtub 12.

Figure 6:
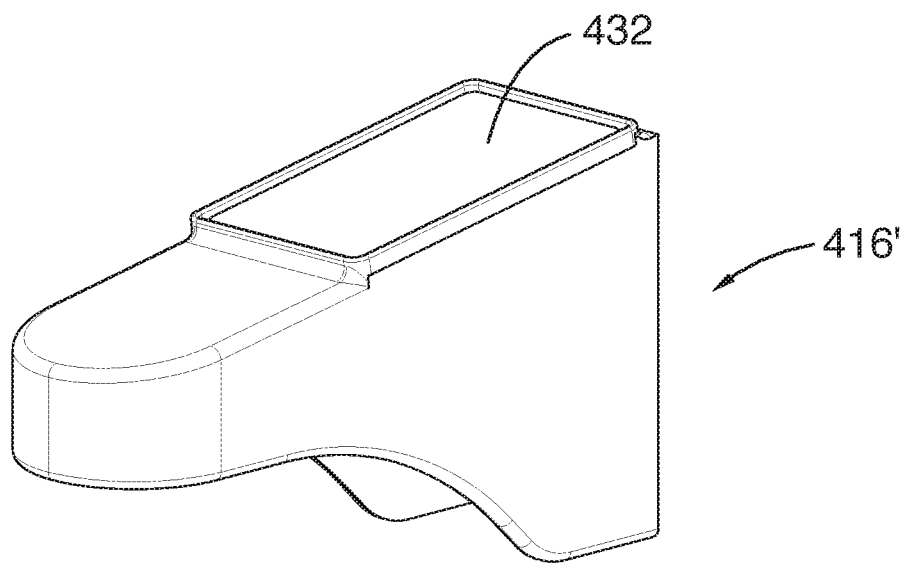
FIG. 6 illustrates a cover for an electronic faucet provided with a solar panel, in accordance with an embodiment.

FIG. 6 illustrates an alternate cover 416' which may be used when the battery 430 is a rechargeable battery. The cover 416' is provided with a solar panel 432 comprising photovoltaic cells for charging the rechargeable battery. The solar panel 432 is electrically connected to the battery 430 via a permanent electrical connection or a disconnectable electrical connector. It should be understood that the solar panel 432 may be secured at any adequate position on the housing 12 or the cover 416'. For example, the solar panel 432 may be secured on the top face of the cover 416' as illustrated in FIG. 6.

While in the present description there is described an electronic faucet, it should be understood that the housing and the cover may be chosen so that the present system applies to any adequate type of automated liquid delivery systems. For example, the automated liquid delivery system may be shower head. In this case, the housing is shaped and sized to correspond to a shower head housing and the cover is chosen so as to correspond to a shower head cover.

Electronic Drain

The electronic drain closure device 16 is secured to the bathtub 12 and connected to an evacuation drain for evacuating the water contained in the bathtub 12. For example, the electronic drain closure device 16 may be a device installed within the evacuation drain of the bathtub to selectively close and open the evacuation drain in order to fill the bathtub with water or evacuate water from the bathtub 12.

The operation of the electronic drain closure device 16 is controlled by a controller such as controller 20.

Figure 7:
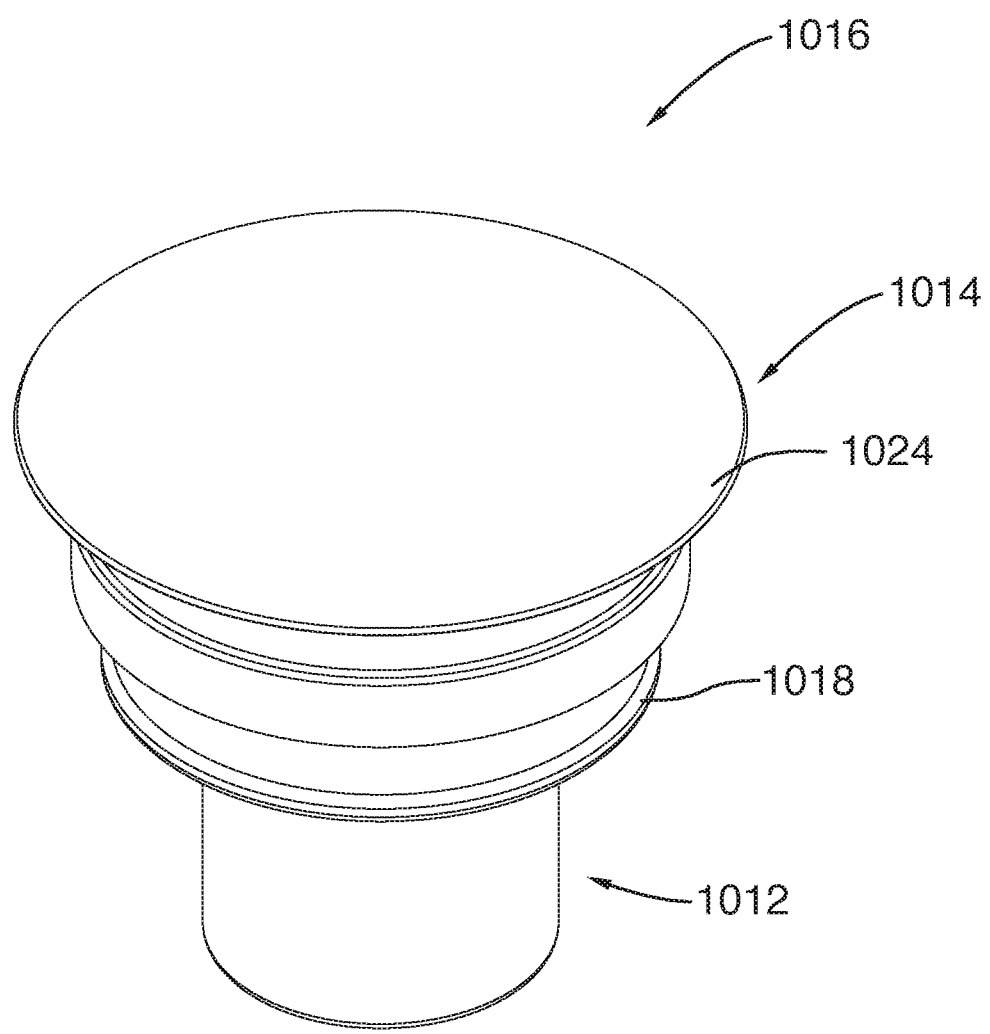
FIG. 7 is a perspective view of an electronic drain closure system in an open position, the electronic drain closure system comprising a drain fitting connectable to a container and an evacuation drain, a closure member and a coupling body for connecting the closure member to the drain fitting, in accordance with an embodiment.
Figure 8:
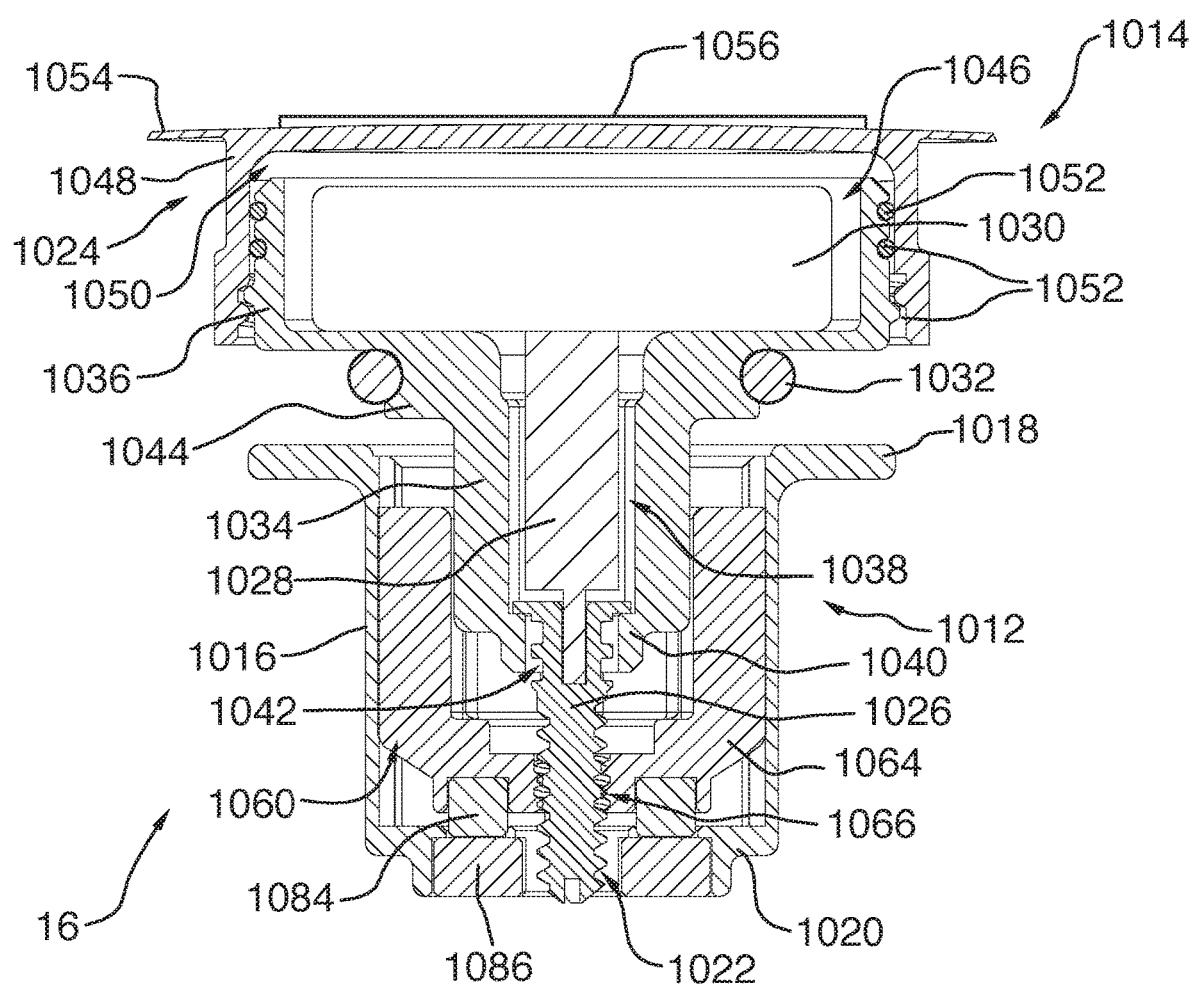
FIG. 8 is a cross-sectional view of the electronic drain closure system when in the open position.

In accordance with one embodiment, FIGS. 7 and 8 illustrate an electronic drain closure system 16 when in an open position. The electronic drain closure system 16 comprises a drain fitting 1012 and a closure member 1014. The drain fitting 1012 is adapted to be secured to a drain opening present in the bathtub for evacuating water contained in the bathtub. The closure member 1014 is movable between an open position in which water may flow in the drain fitting and a closed position in which the closure member 1014 substantially hermetically closes the drain fitting so that no water may flow into the drain fitting.

In the embodiment illustrated in FIG. 8, the closure member 1014 is in the open position. As illustrated, the drain fitting 1012 comprises a tubular body 1016 extending between a top end and a bottom end. The drain fitting 1012 also comprises a flange 1018 extending radially and outwardly from the top end of the tubular body 1016. In order to secure the drain fitting to a bathtub, the drain fitting 1012 is inserted into the drain opening of the bathtub until the flange 1018 abuts against the wall of the bathtub that surrounds the drain opening. The bottom end of the drain fitting 1012 is then connected to an evacuation drain for evacuating water. For example, the bottom end of the drain fitting 1012 may be inserted into the evacuation drain. In this case, the outer diameter of the bottom end of the drain fitting may be chosen to substantially correspond to the internal diameter of the evacuation drain so that the bottom end of the drain fitting 1012 snuggingly engages the evacuation drain when inserted therein. In another example, the evacuation drain may be inserted into the bottom end of the drain fitting 1012. In this case, the internal diameter of the bottom end of the drain fitting 1012 may be substantially equal to the external diameter of the evacuation drain so that the bottom end of the drain fitting 1012 snuggingly engages the evacuation drain when evacuation drain is inserted into the drain fitting 1012.

A wall 1020 extends transversely through the interior chamber of the tubular body 1016 at the bottom end thereof. The size and shape of the wall 1020 are chosen so that the wall 1020 does not extend through the entire cross-section of the tubular body 1016 so that water may flow therethrough from the top end of the tubular body 1016 to the bottom end in order to be evacuated via the evacuation drain.

In one embodiment, the wall 1020 further comprises a threaded hole 1022 which is positioned substantially at the center of the wall 1020, as shown in the illustrated embodiment. In another embodiment, the hole 1022 may not be threaded.

Figure 9:
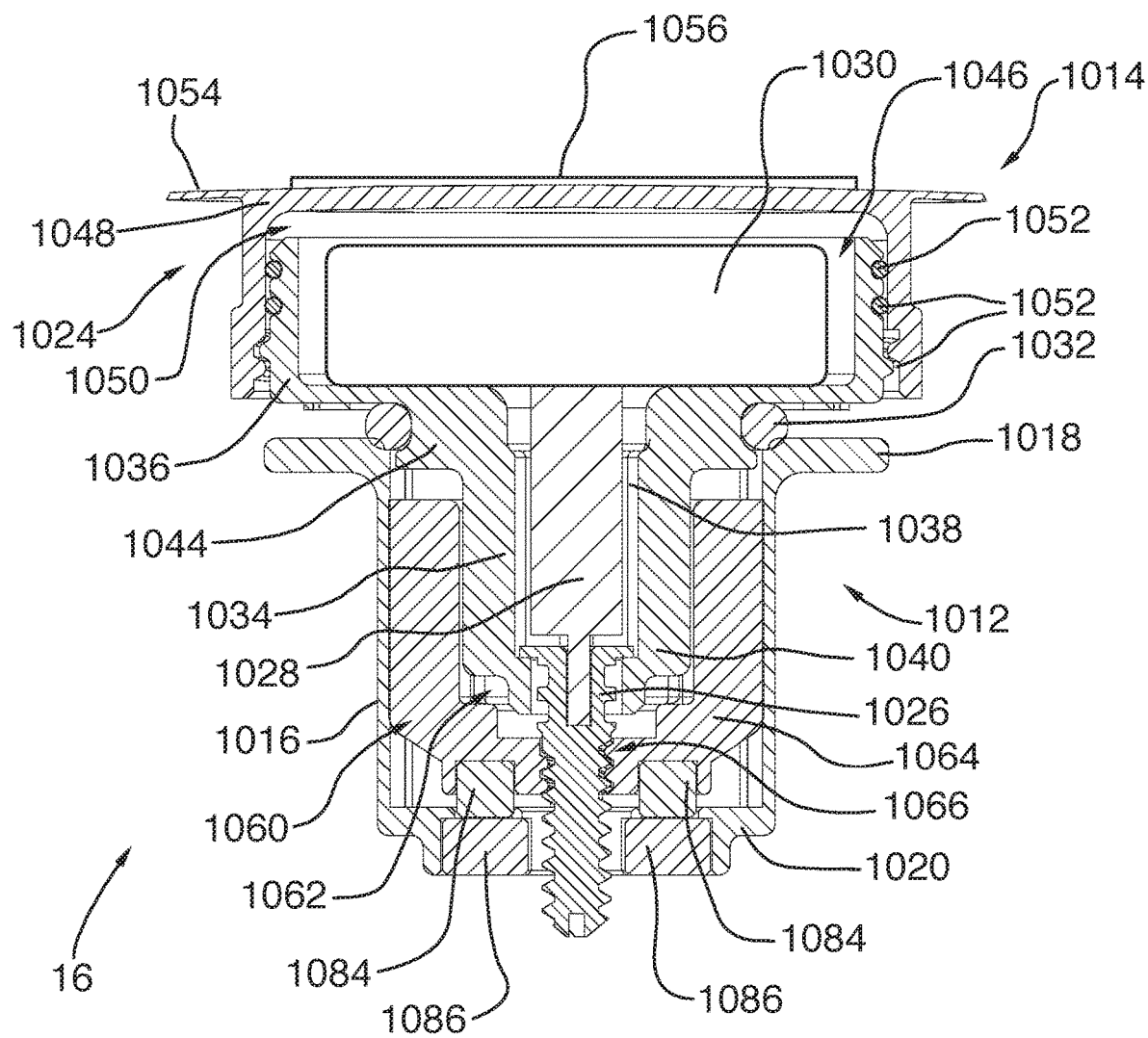
FIG. 9 is a cross-sectional view of the electronic drain closure system when in a closed position.

The closure member 1014 is movably secured to the drain fitting 1012 and is movable between an open position in which the closure member 1014 is away from the drain fitting 1012, as illustrated in FIG. 8, and a closed position in which the closure member 1014 abuts against the drain fitting 1012, as illustrated in FIG. 9. When the closure member 1014 is in the open position, water may flow from the bathtub into the evacuation drain via the drain fitting 1012. When the closure member 1014 is in the closed position, water is prevented from flowing into the drain fitting 1012.

In the illustrated embodiment, the closure member 1014 comprises a casing 1023, a cover 1024, a drive screw 1026, an electrical motor 1028, a battery 1030, a gasket 1032, a controller (not shown), and a communication unit comprising an antenna for at least receiving signals (not shown). The casing 1023 comprises a bottom casing portion 1034 having a tubular shape and a top casing portion 1036 having a tubular shape and being positioned on top of the bottom casing portion 1034. The diameter of the bottom casing portion is chosen so that the bottom casing portion 1034 be insertable into the coupling body 1060. The bottom and top casing portions 1034 and 1036 may be seen as a hollow T-shaped body.

The bottom casing portion 1034 comprises a motor receiving chamber 1038 which extends from a top end thereof to a bottom wall 1040 which closes the bottom end of the bottom casing portion 1034. The bottom wall 1040 of the bottom casing portion 1034 is provided with a threaded hole 1042 which emerges into the motor receiving chamber 1038 and in which the drive screw 1026 is rotatably inserted. The motor 1028 is inserted into the motor receiving chamber 1038 and the drive screw 1026 is operatively connected to the motor 1028 so that an activation of the motor 1028 triggers a rotation of the drive screw 1026. The portion of the drive screw 1026 which is inserted into the threaded hole 1042 is provided with at least one horizontal thread on its external surface, i.e. the threads are orthogonal to the longitudinal axis of the drive screw 1026. Similarly, the threaded hole comprises at least one horizontal thread so that the activation of the motor 1028 triggers a rotation of the drive screw 1026 with respect to the casing 1023 while preventing any translation of the drive screw relative to the casing 1023. The bottom section of the drive screw 1026 is provided with threads that are angled with respect to the longitudinal axis of the drive screw 1026 to allow translation of the closure member 1014 relative to the drain fitting 1012 as described below.

The bottom casing portion 1034 further comprises four protrusions 1043 which each protrude outwardly from the external face of the bottom casing portion 1034 and each extend longitudinally along at least a section of the length of the bottom casing portion 1034. In the illustrated embodiment, the protrusions 1043 are evenly positioned around the circumference of the top end of the bottom casing portion 1034. However, it should be understood that other configurations may be possible. For example, the protrusions 1043 may not be evenly distributed around the circumference of the bottom casing portion 1034. It should also be understood that the number, shape, size, and/or position of the protrusions 1043 may vary as long as the bottom casing portion 1034 comprises at least one protrusion projecting from the outer surface of the bottom casing portion 1034.

The bottom casing portion 1034 further comprises a protrusion or flange 1044 which extends radially and outwardly from the top end of the bottom casing portion 1034 along the circumference thereof, and the circular gasket 1032 is installed around the protrusion 1044. The protrusion 1044 may also be seen as being part of the top casing portion 1036. In the illustrated embodiment, the diameter of the protrusion 1044 is chosen so as to be equal to or less than the internal diameter of the drain fitting 1012. In this case and when the drain closure system is in a closed position, the bottom end of the protrusion penetrates into the drain fitting 1012 and the gasket 1032 abuts against the flange 1018 of the drain fitting 1012 in order to close the drain fitting 1012. In the illustrated embodiment, the diameter of the top casing portion 1036 is greater than that of the protrusion 1044.

The top casing portion 1036 comprises a battery receiving chamber 1046 which extends from the top end of the top casing portion 1034 to a bottom end thereof and a bottom wall 1045 is used for securing the bottom casing portion 1034 to the top casing portion 1036. The wall 1045 has a first end secured to the flange 1044 of the bottom casing portion 1034 and a second and opposite end secured to the bottom end of the top casing portion 1036. As illustrated in FIG. 8, the motor receiving chamber 1038 emerges into the battery receiving chamber 1046 so that the battery 1030 be electrically connected to the motor 1028 for powering the motor 1028.

The cover 1024 is used for enclosing at least the electrical motor 1028 and the battery 1030 within the casing 1023 while preventing water from propagating within the motor receiving chamber 1038 and the battery receiving chamber 1046. The cover 1024 comprises a cylindrical body 1048 provided with a recess 1050 which extends from the bottom of the cylindrical body 1048 towards a top wall thereof. The recess 1050 is sized and shaped so as to receive the top casing portion 1036 therein. Circular gaskets 1052 are inserted around the lateral surface of the top casing portion 1036 between the top casing portion 1036 and the cover 1024 so as to prevent any water from flowing into the top casing portion 1036 and thereby protect the electrical components contained into the closure assembly 1014 from water.

In one embodiment, the cover 1024 may be removably secured to the top casing portion 1036 by friction forces created when the cover 1024 is positioned on top and over the top casing portion 1036.

In another embodiment, the lateral and external face of the top casing portion 1036 may be threaded and the internal face of the cover 1024 may also be threaded so that the cover 1024 may be secured to the top casing portion 1036 by screwing the cover 1024 on the top casing portion 1036.

It should be understood that any adequate system/method for removably and hermetically securing the cover 1024 to the top casing portion 1036 may be used. For example, screws may be used.

In one embodiment, the cover 1024 is further provided with a flange 1054 that extends radially and outwardly from the top of the cover 1024.

In the same or another embodiment, the cover 1024 is further provided with a solar panel 1056 comprising photovoltaic cells that is secured to the top wall of the cover 1024. In this case, the solar panel is electrically connected to the battery 1030 and the battery 1030 is a rechargeable battery adapted to be recharged by the solar panel 1056.

In one embodiment, the electronic drain closure system 16 comprises a guiding or coupling body 1060 insertable into the drain fitting 1012. In one embodiment, the coupling body 1060 is fixedly securable to the drain fitting 1012. In another embodiment, the coupling body 1060 is removably securable to the drain fitting 1012. The coupling body 1060 is sized and shaped so that water may flow through the drain fitting while the coupling body 1060 is inserted into the drain fitting 1012. For example, the coupling body 1060 may has a cylindrical shape and be provided with at least one hole extending along its entire length to allow water to flow therethrough.

Figure 10:
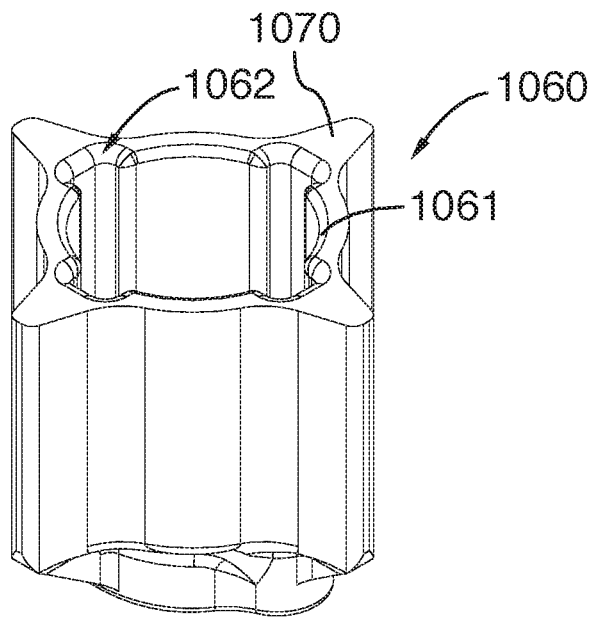
FIG. 10 is a perspective view of the coupling member of the electronic drain closure system of FIG. 1, in accordance with an embodiment.
Figure 11:
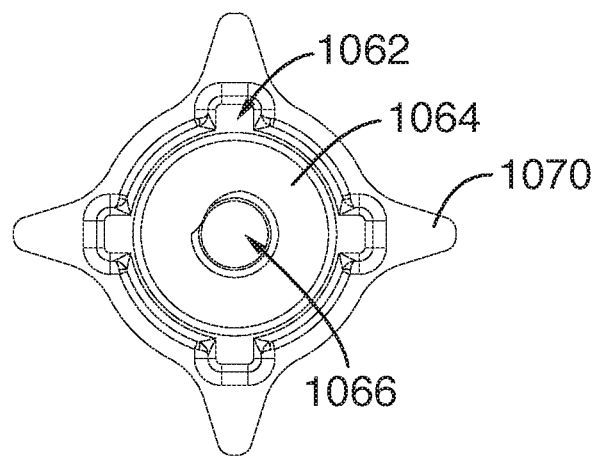
FIG. 11 is a top view of the coupling member of FIG. 10.
Figure 12:
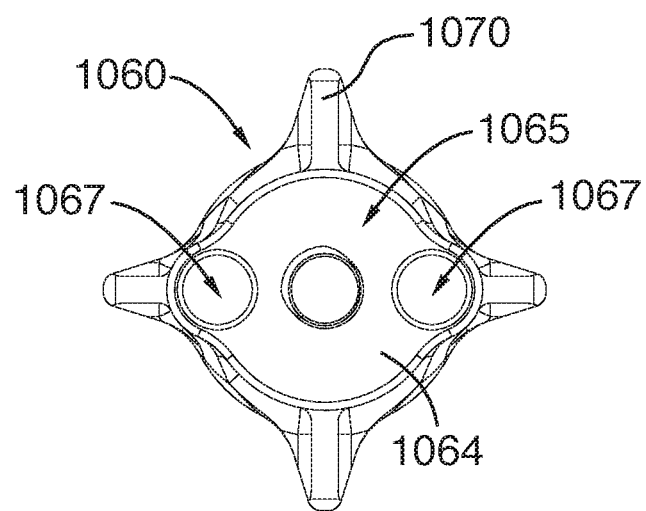
FIG. 12 is a bottom view of the coupling member of FIG. 10.
Figure 13:
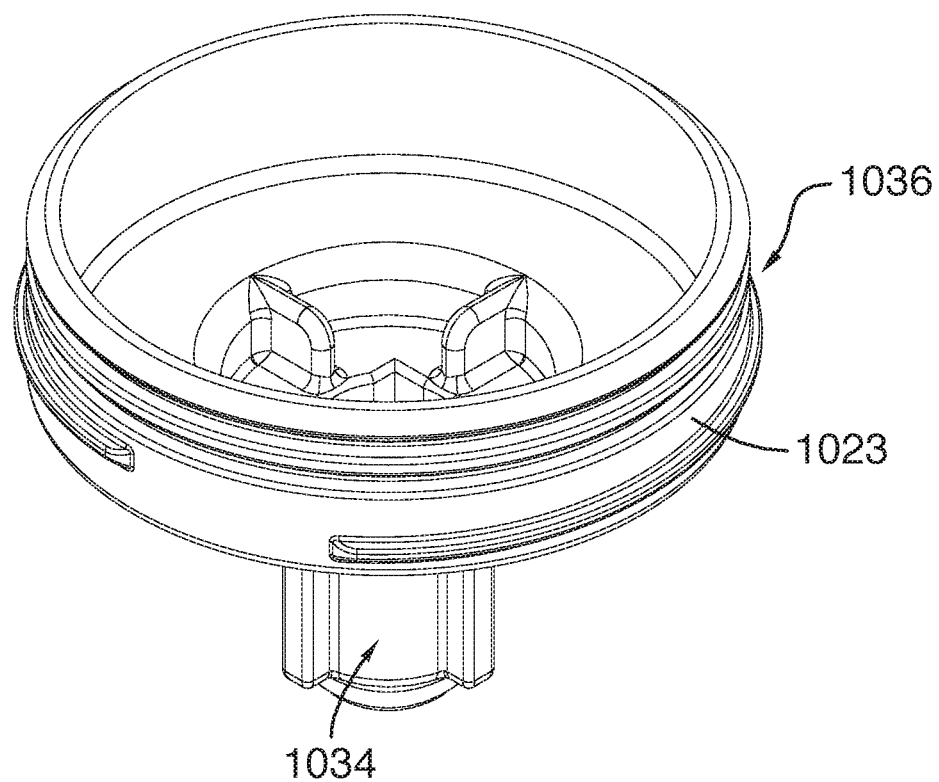
FIG. 13 is a perspective view of the closure member of the electronic drain closure system of FIG. 7 with the cover omitted, in accordance with an embodiment.
Figure 14:
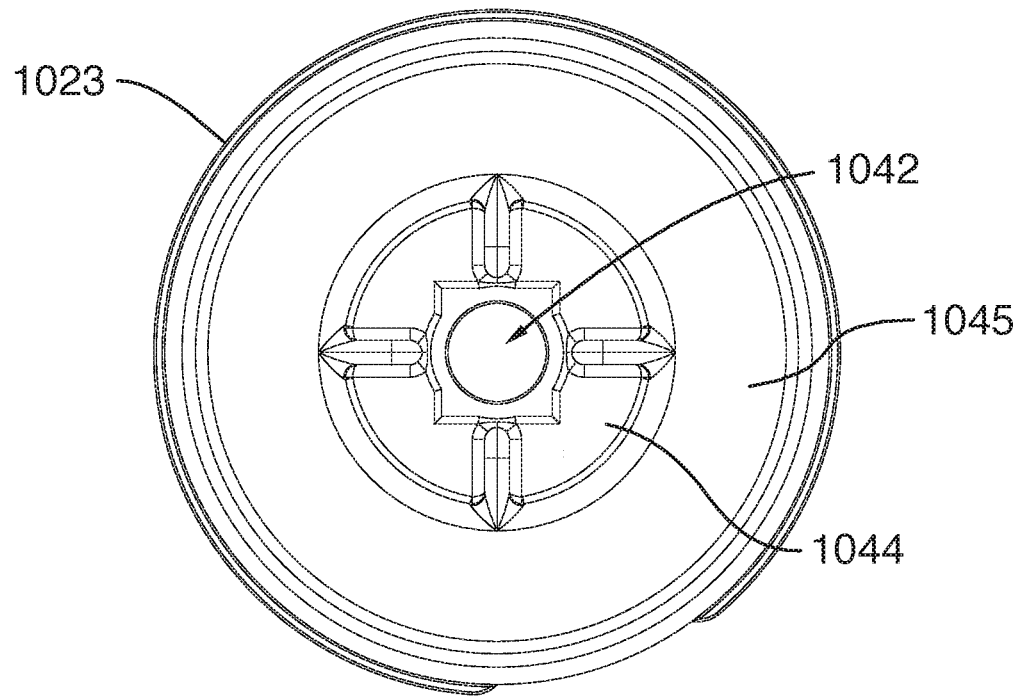
FIG. 14 is a top view of the closure member of FIG. 13.
Figure 15:
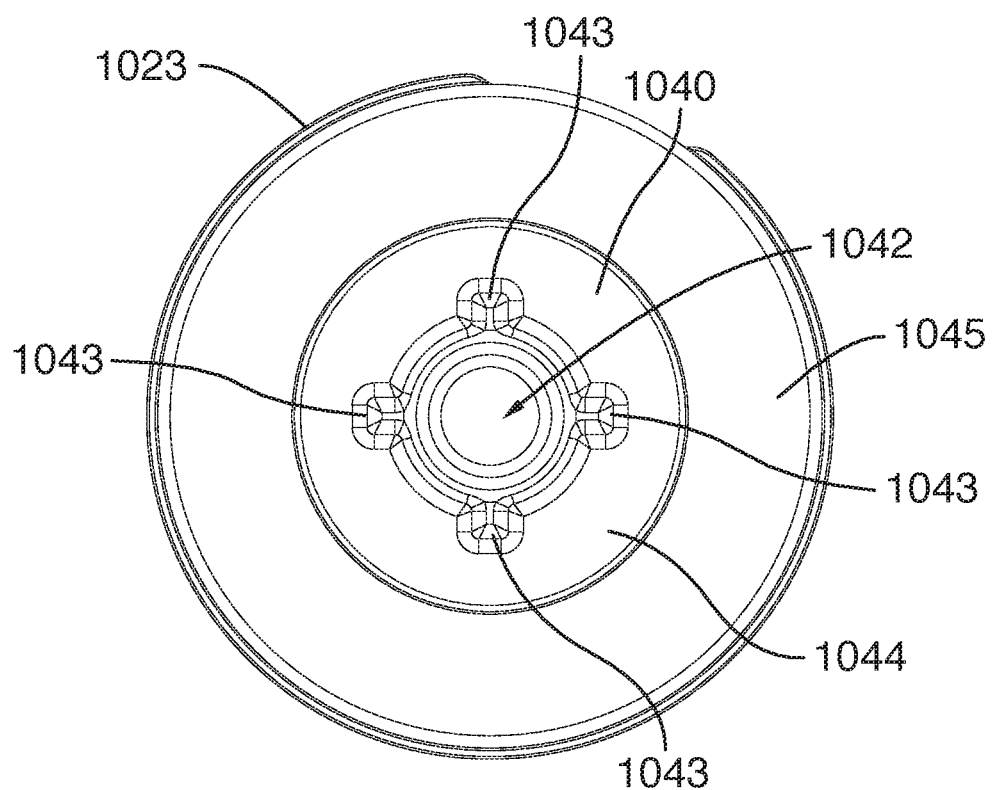
FIG. 15 is a bottom view of the closure member of FIG. 13.

As illustrated in FIGS. 10 to 12, the coupling body 1060 comprises a tubular body 1061 extending between a top end and a bottom end and a wall 1064 closes the bottom end of the tubular body 1061. The tubular body defines a chamber adapted to receive the bottom casing portion 1034 of the closure member 1014 therein. The internal diameter of the tubular body 1061 substantially corresponds the external diameter of the bottom casing portion 1034 of the closure member 1014 and the internal face of the tubular body 1061 comprises four internal recesses 1062 each positioned, sized and shaped for receiving a respective protrusion 1043 of the bottom casing portion 1034 of the closure member 1014. In the illustrated embodiment, the internal recesses 1062 are evenly distributed around the circumference of the internal face of the tubular body 1061 and each extend along substantially the entire length of the internal face of the tubular body 1061. It should be understood that other configurations may be possible depending on the number, size, shape and position of the protrusions 1043.

The bottom wall 1064 of the coupling body 1060 is provided with a threaded aperture 1066 in which the drive screw 1026 is inserted. The thread of the aperture 1066 is angled so as to correspond the angled thread of the drive screw 1026. The bottom face 1065 of the bottom wall 1064 is also provided with two magnet receiving recesses 1067 each adapted to receive a respective magnet therein.

The tubular body 1061 is further provided with four protrusions 1070 which each project outwardly and radially from the external face thereof. The protrusions 1070 each extend along a section of the length of the tubular body 1061. The protrusions 1070 are evenly distributed around the circumference of the tubular body 1061 so that each protrusion 1070 faces a respective recess 1062. It should be understood that other configurations may be possible as long as the tubular body 1061 is provided with at least one protrusion projecting from the outer face of the tubular body 1061. For example, the number, shape, size and position of the protrusions 1070 may vary. The space defined between two adjacent protrusions 1070 allows water to flow from the bathtub into the evacuation drain.

Figure 16:
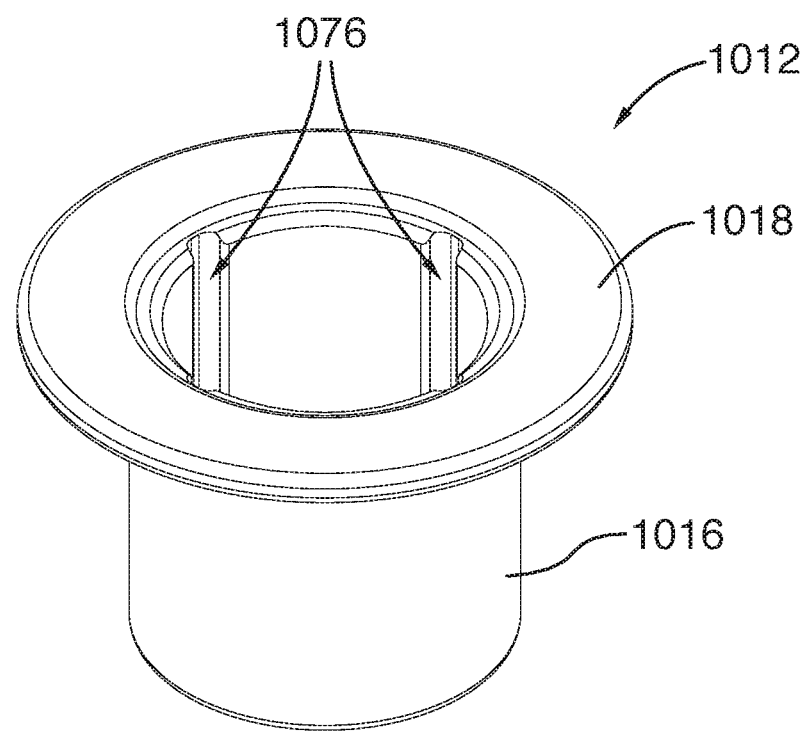
FIG. 16 is a perspective view of the drain fitting of the electronic drain closure system of FIG. 7, in accordance with an embodiment.
Figure 17:
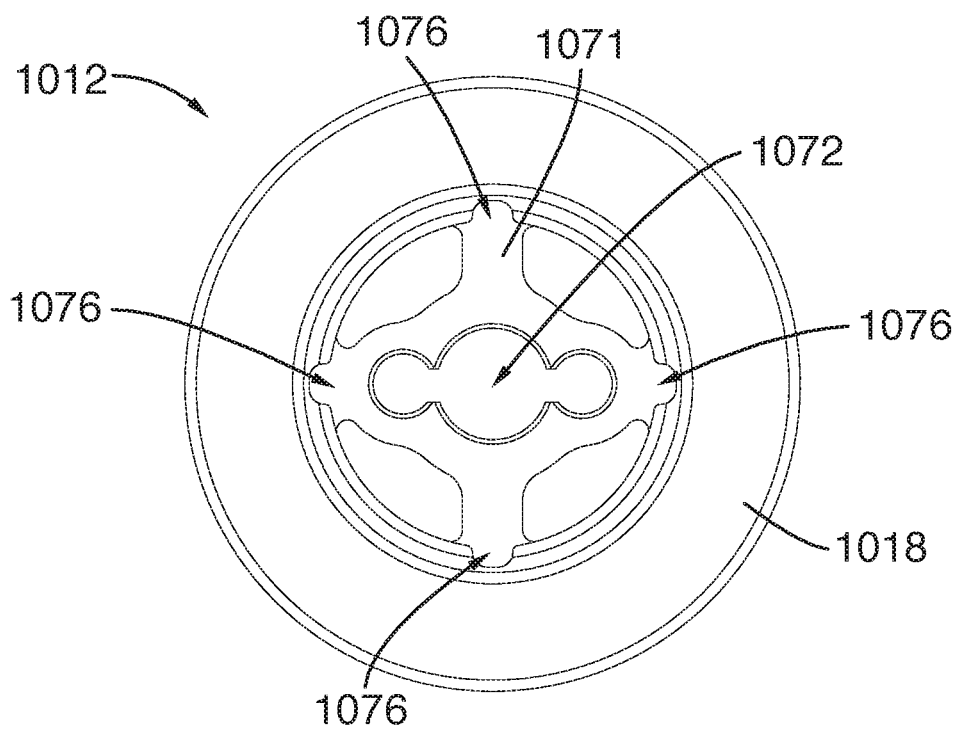
FIG. 17 is a top view of the drain fitting of FIG. 16.
Figure 18:
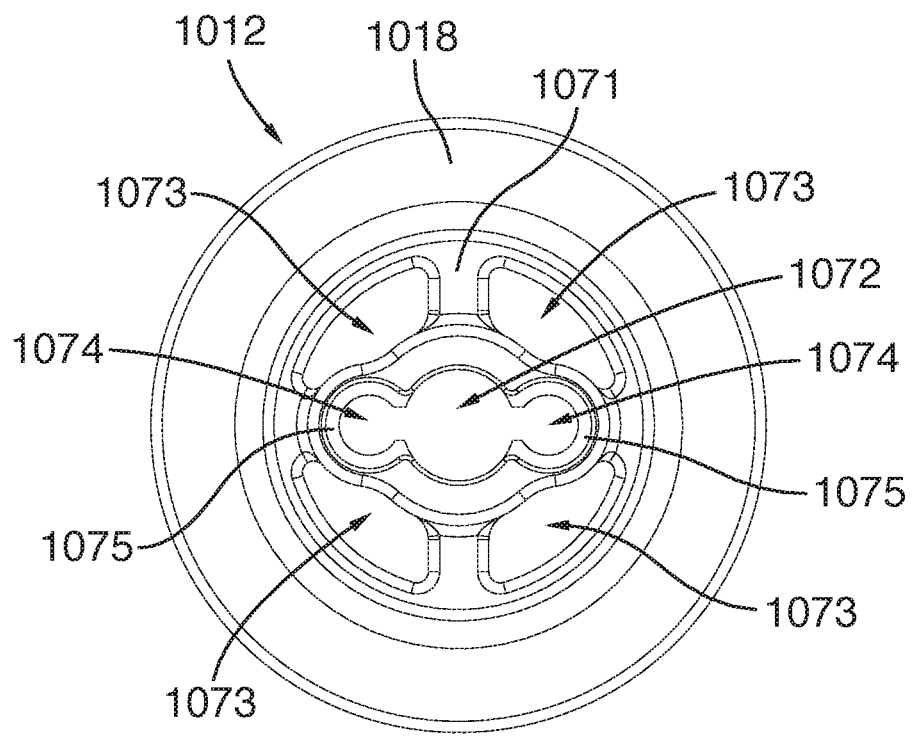
FIG. 18 is a bottom view of the drain fitting of FIG. 16.

As illustrated in FIGS. 16 to 18, the drain fitting 1012 comprises a tubular body 1016 extending between a top end and a bottom end. The internal diameter of the tubular body 1016 is chosen so as to receive the coupling body 1060 therein. The internal face of the tubular body 1016 is provided with four recesses 1068 each sized and shaped for receiving a respective protrusions 1070 therein. A flange 1018 extends radially and outwardly from the top end of the tubular body 1016 around the circumference thereof.

The drain fitting 1012 further comprises a bottom wall 1071 at the bottom end of the tubular body 1016. The bottom wall 1071 comprises a central threaded aperture 1072 for receiving the drive screw 1026 therein. It should be understood that the central aperture 1072 may not be threaded. The bottom wall 1071 further comprises four openings 1073 which each extends therethrough for allowing water to flow from the bathtub into the evacuation drain. The bottom wall 1071 also comprises two magnet receiving openings 1074 which each extend from the top of the bottom wall 1071 to its bottom end. A flange 1075 projects from the top end of the bottom wall 1071 within the magnet receiving aperture and extends along a portion of the circumference of the magnet receiving opening 1074. The flange 1075 allows maintaining a magnet into the magnet receiving aperture 1074 and prevents the magnet from moving into the cavity defined by the tubular body 1061.

The internal face of the tubular body 1061 is provided with four recesses 1076 which each extend along the length of the tubular body 1061. The recesses 1076 are evenly distributed around the circumference of the internal face of the tubular body 1061 so as to each receive therein a respective protrusions 1070 It should be understood that the position, shape, size and number of recesses 1076 may vary depending on the number, size, shape and position of the protrusions 1070.

In an embodiment in which it is removably securable to the drain fitting 1012, the coupling body 1060 may comprise two magnets 1084 each inserted into a respective magnet receiving recess 1067, and the drain fitting 1012 may also be provided with two magnets 1086 each inserted into a respective magnet receiving aperture 1074. The magnet receiving recesses 1067 and the magnet receiving apertures 1074 are positioned so that each magnet 1084 faces a respective magnet 1086 when the coupling body 1060 is inserted into the drain fitting 1012. AS a result of the magnetic force between the magnets 1084 and 1086, the coupling body 1060 is removably securable to the drain fitting 1012. The magnetic force generated between the magnets 1084 and 1086 allow preventing any translation movement of the coupling body 1060 relative to the drain fitting 1012. It should be understood that the number of magnets, magnet receiving recesses and magnet receiving apertures may vary. Similarly, the position, size, shape of the magnets, the magnet receiving recesses and the magnet receiving apertures may vary.

In another embodiment, the coupling body 1060 may be fixedly secured within the drain fitting 1012. In this case, the magnet receiving recesses 1067, the magnet receiving apertures 1074 and the magnets 1084 and 1086 may be omitted. Any adequate method for fixedly securing the coupling body 1060 to the drain fitting 1012 may be used.

In one embodiment, the coupling body 1060 may be omitted. In this case, the closure member 1014 is movably secured to the drain fitting 1012 thanks to the drive screw 1026 which threadingly engages the threaded aperture 1072 of the drain fitting. The protrusions 1043 may be sized and shaped for being received in a respective recess 1076 so as to prevent any rotation of the closure member 1014 relative to the drain fitting 1012.

In order to assemble the electronic drain closure system 16, the coupling body 1060 is inserted into the drain fitting 1012 so that each protrusions 1070 be received in a respective recess 1076. Once the protrusions 1070 are each received in a respective recess 1076, the coupling body 1060 cannot rotate relative to the drain fitting. Then the casing 1023 of the closure member 1014 is inserted into the coupling body. This is done by inserting each protrusion 1043 into a respective recess 1062 and screwing the drive screw into the threaded aperture 1066 of the coupling body 1060 and the threaded aperture 1072 of the drain fitting 1012. Then the electrical motor 1028, the battery 1030, the controller and the communication unit are inserted into the casing 1023 and operatively connected together and to the drive screw 1026. The cover 1024 is then secured to the casing 1023, thereby hermetically enclosing the components installed in the casing 1023. The electronic drain closure system 16 can then be secured to the bathtub and fluidly connected to the evacuation drain.

It should be understood that the order of the above steps is exemplary only. For example, the different components to be installed in the casing may be first positioned in the casing 1023. Then the cover 1024 may be secured to the casing 1023 before inserting the closure member 1014 into the coupling body 1060 and inserting the coupling body into the drain fitting 1012.

In order to selectively open and close the electronic drain closure system 16, the electrical motor 1028 is activated which triggers a rotation of the drive screw 1026 in a respective rotation direction. The drive screw 1026 then rotates relative to the casing 1023 but does not translate relative to the casing 1023. Since the coupling body 1060 cannot translate and rotate relative to the drain fitting 1012 and the drain fitting 1012 is fixedly secured to the bathtub, the rotation of the drive screw 1026 triggers a translation of the closure member 1014 into the coupling body 1060. Depending on the rotation direction of the drive screw 1026, the closure member will translate upwardly to allow water to flow from the bathtub into the evacuation drain or downwardly to abut the gasket 1032 against the top end of the drain fitting 1012, thereby preventing water to flow from the bathtub into the evacuation drain.

In order to operate the electronic drain closure system 16, a wireless command signal is sent from a remote control such as a mobile device to the electronic drain closure system 16. The wireless communication unit receives the command signal which is transmitted to the controller of the electronic drain closure system 16. If the command indicates that the electronic drain closure system 16 must be closed, the controller activates the motor 1028 to downwardly translate the bottom casing portion 1034 into the coupling body 1060. The electronic drain closure system 16 is then closed as illustrated in FIG. 9. In this position, the gasket 1032 abuts against the casing 1023 and the drain fitting 1012, thereby preventing water from flowing into the drain fitting 1012. If the command indicates that the electronic drain closure system 16 must be opened, the controller activates the motor 1028 to upwardly translate the bottom casing portion 1034

In one embodiment, the electronic drain closure system 16 further comprises a sensor for detecting the presence of a liquid such as water. In this case, the controller is further configured to activate the communication unit, i.e. powering the communication unit only when the sensor detects the presence of water in the bathtub or in the vicinity of the electronic drain closure system 16, depending on the location of the sensor. In this case, the sensor may continuously or periodically send signals indicative of the presence and/or absence of water to the controller. When the signal sent by the sensor is indicative of the presence of water, the controller activates the communication unit by powering the communication unit which then listens to command signals to be sent from the remote control. When the signal sent by the sensor is indicative of the absence of water, the controller deactivates the communication unit by cutting the power to the communication unit, thereby saving energy stored in the battery by not depleting the battery when no water is detected.

Figure 19:
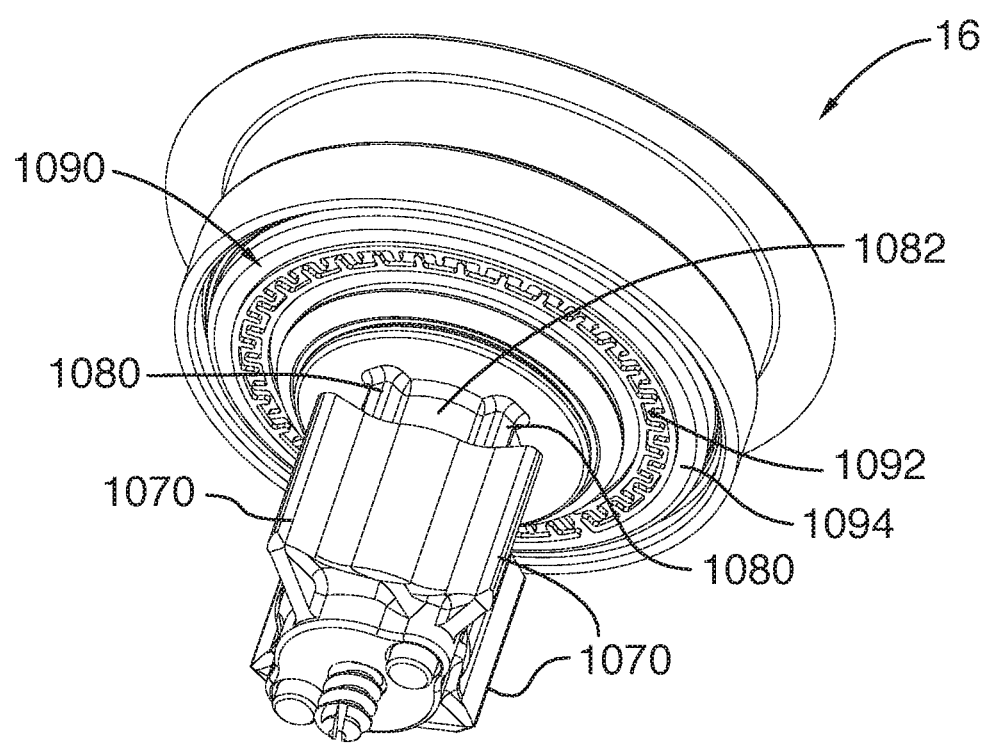
FIG. 19 is a perspective view of an assembly formed of the closure member and the coupling body of FIG. 7 the closure member being provided with a liquid sensor, in accordance with an embodiment.
Figure 20:
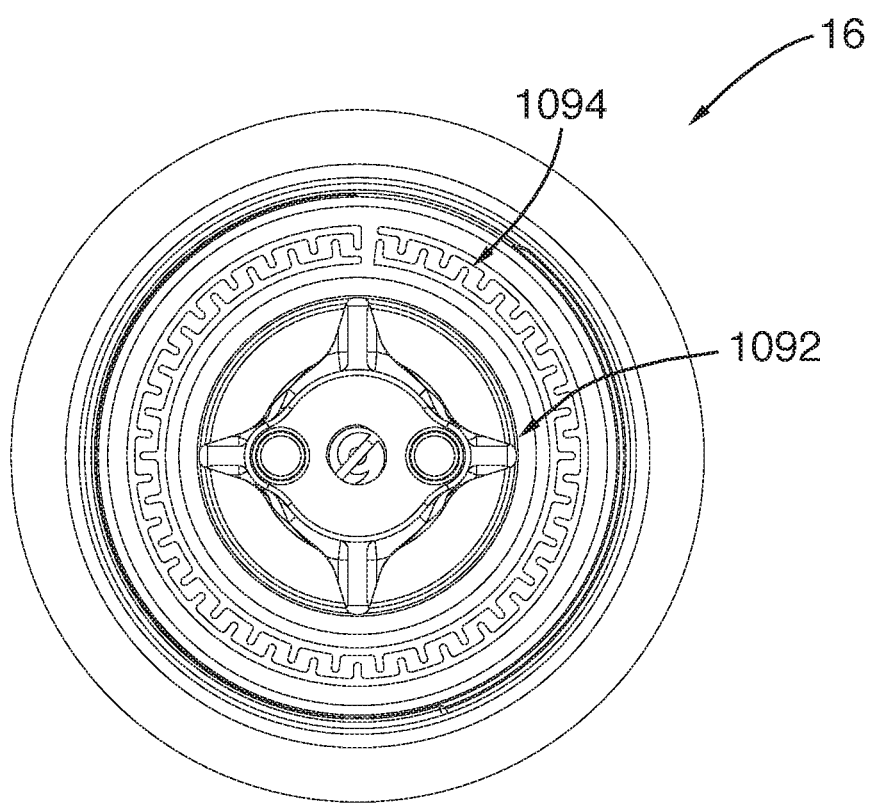
FIG. 20 is a bottom view of the assembly of FIG. 9.

FIGS. 19 and 20 illustrate one exemplary sensor 1090 for detecting the presence of liquid such as water. The sensor 1090 is located on the bottom face of the top casing portion 1036. The sensor 1090 comprises two circular and concentric electrical conductors 1092 and 1094 which are spaced apart by a given distance.

The electrical conductors 1092 and 1094 are part of an electrical circuit and form together a switch. An electrical current is applied to one of the conductors 1092 and 1094. Because of the gap of air between the two conductors 1092 and 1094, the electrical current cannot propagate into the other one of the conductors 1092 and 1094. However, when water is present between the two conductors 1092 and 1094 and because water is electrically conductive, the electrical current can flow between the two conductors 1092 and 1094, thereby closing the electrical circuit.

Therefore, when no water is present between the two conductors 1094 and 1092, no electrical current can flow between the two conductors 1092 and 1094 and the sensor 1090 determines that no water is present and sends a signal indicative of the absence of water to the controller. When water is present between the two conductors 1094 and 1092, then the electrical current can flow between the two conductors 1092 and 1094 and the sensor 1090 determines that the presence of water and sends a signal indicative of the presence of water to the controller.

It should be understood that the position of the sensor 1090 may vary. For example, the sensor 1090 may be located on the top face of the cover 1024 around the optional solar panel 1056.

It should also be understood that the sensor 1090 is exemplary only and that any adequate sensor adapted to detect the presence of a liquid such as water may be used.

In one embodiment, the battery 1030 may be omitted and the closure member 1014 may be electrically connectable to a power source such as a grid.

While the present electronic drain closure system 16 is described in connection with a bathtub for selectively opening and closing an evacuation drain, it should be understood that the electronic drain closure system 16 may be used in connection with any adequate container for containing a liquid. For example, the electronic drain closure system 16 may be installed on a shower base, a swimming pool, or the like. Furthermore, while the drain closure system 16 has been described in connection with the illustrated embodiment, it will be understood that a different drain closure system could be used in conjunction with the automated water delivery system 10. For instance, in an alternate embodiment, the automated water delivery system 10 could be provided with a drain closure apparatus mechanically coupled to an electric motor remotely located, for instance located to an exterior side wall of the bathtub 12, or adjacent to an elbow connector fluidly connected to an overflow drain (e.g. elbow connector 25105, as best described below). In such an embodiment, the electric motor could be coupled to a transmission consisting of a rack and pinion, which transmission is connected to the drain closure, underneath bath 12, through a cable mechanism. In such an embodiment, the operation of the electric motor would urge movement of the rack and pinion transmission, which itself would result in a translation movement of the cable, to move the drain closure system between an open and a closed position.

Level Sensor

The level sensor 18 is adapted to monitor the level of water within the bathtub 12, i.e. determine the height of water contained within the bathtub 12. In one embodiment, the level sensor 18 is a contact sensor, i.e., the level sensor 18 detects the level of water when in contact with the water. In another embodiment, the level sensor 18 is a remote or contactless level sensor, i.e., it can detect the level of water without any contact with water. For example, the contactless level sensor may be an ultrasonic level sensor.

In one embodiment, the level sensor 18 is adapted to measure different levels of water within the bathtub 12. For example, the level sensor 18 may be a continuous sensor adapted to continuously measure the level of water within the bathtub 12 independently of the level of water. In another embodiment, the level sensor 18 may be a point sensor adapted to determine whether the level of water within the bathtub 12 has reached at least one predefined level. A point level sensor 18 may be adapted to detect different predefined levels of water within the bathtub 12.

In one embodiment, the level sensor 18 may correspond to an overflow sensor which is adapted to detect an overflow level, i.e. the level of water contained within the bathtub 12 that corresponds to or is adjacent to the height of the overflow aperture connected to an overflow drain. Alternatively, the level sensor 12 may be adapted to detect more than the overflow level. For example, the level sensor 12 may be adapted to detect a low level and a high level in addition to the overflow level.

Figure 21:
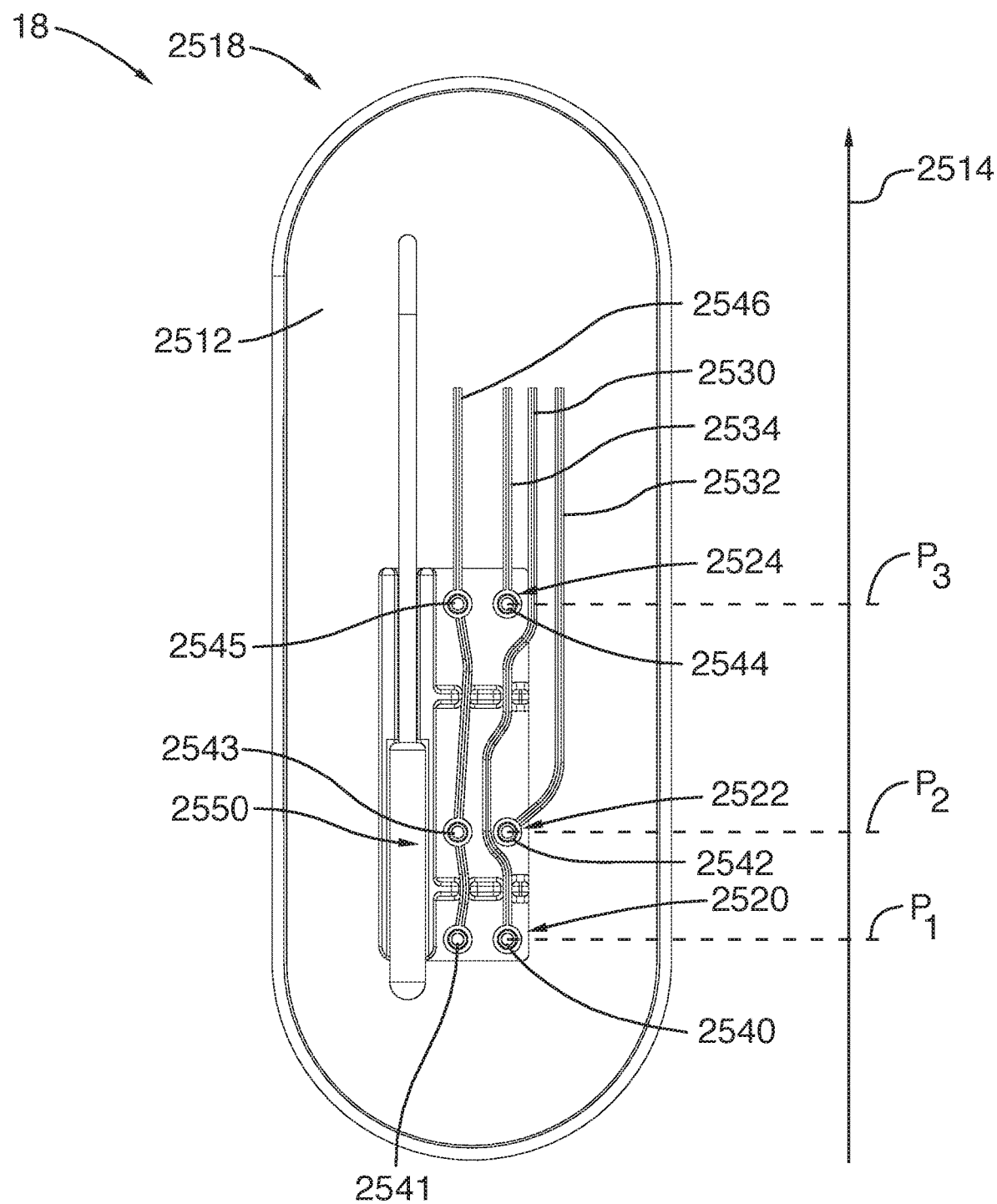
FIG. 21 is a rear view of an apparatus for determining the level of a liquid contained in a container, in accordance with an embodiment.

In accordance with one embodiment, FIG. 21 illustrates one embodiment of an apparatus 18 for determining the level of liquid contained in a container. The apparatus comprises a body or casing 2512 that is securable to the container. The plate 2512 extends along a longitudinal axis 2514 and has a substantially rectangular shape provided with rounded ends 2516 and 2518. The apparatus comprises three sensors 2520, 2522, and 2524 each adapted to detect the presence of a liquid at a respective and different position $P_1$, $P_2$ and $P_3$ along the longitudinal axis 2514 of the body 2512. The body 2512 is secured to the container so that the three sensors 2520, 2522, and 2524 are located at different locations along the height of the container.

The apparatus 18 is secured to the container for which the level of liquid is to be sensed at an adequate position. The apparatus 18 may be positioned so that its longitudinal axis 2514 be substantially vertical with the end 16 facing the ground. When the level of liquid contained in the container is below the sensor 2520, no sensor 2520, 2522, 2524 detects the presence of liquid. When no sensor 2520, 2522, 2524 detects the presence of liquid, the level of liquid is assumed to be below the position $P_1$. When the level of liquid is between the sensors 2520 and 2522, the sensors 2520 detects the presence of liquid while the sensors 2522 and 2524 each detect no liquid. When only the sensor 2520 detects the presence of liquid, the level of liquid is assumed to be located at or above the position $P_1$ while being located below the position $P_2$. When the level of liquid is between the sensors 2522 and 2524, the sensors 2520 and 2522 each detect the presence of liquid while the sensor 2524 detects no liquid. When only the sensors 2520 and 2524 detect the presence of liquid, the level of liquid is assumed to be located at or above the position $P_2$ while being below the position $P_3$. When the level of liquid is above the sensor 2524, the three sensors 2520, 2522 and 2524 each detect the presence of liquid. In this case, the level of liquid is assumed to be located at the position $P_3$ or above the position $P_3$.

While the above description refers to three sensors 2520, 2522 and 2524, it should be understood that the number of sensors may vary as long as the apparatus 18 is provided with at least one sensor adapted to detect at least one level of liquid. For example, the apparatus 18 may comprise a single sensor that is adapted to detect a single level of liquid. In another example, the apparatus 18 may comprise a single sensor that is adapted to detect a plurality of levels of liquid.

In one embodiment, the apparatus 18 is used in connection with a bathtub comprising an overflow aperture for evacuating water in order to prevent a water overflow. In this case, the body 2512 may correspond to an overflow cover to be secured over the overflow aperture of the bathtub connected to the overflow drain. The position $P_3$ along the longitudinal axis 2514 of the body 2512 may then be chosen so as to be aligned with the overflow aperture or in the vicinity of the overflow aperture such as just below the bottom of the overflow aperture in the bathtub. The sensor 2524 is then used to indicate an overflow of water. The position $P_1$ and $P_2$ may be chosen so as to each correspond to predefined levels of water or volumes of water. For example, the position $P_1$ may correspond to a low level of water within the bathtub while the position $P_2$ may correspond to a high level of water within the bathtub.

In the illustrated embodiment, the sensors 2520, 2522, 2524 each comprise a respective input electrical conductor 2530, 2532, 2534 each having a terminal 2540, 2542, 2544 that emerges from the body 2512 so as to be in physical contact with a liquid. It should understood that only the terminal 2540, 2542, 2544 emerges from the body 2512 while the remaining of the electrical conductor 2530, 2532, 2534 is inserted within the body so that only the terminal

2540, 2542, 2544 can be in physical contact with the liquid. The terminals 2540, 2542, 2544 are positioned along the longitudinal axis 2514 at the positions $P_1$, $P_2$ and $P_3$, respectively. The body 2512 further comprises an output electrical conductor 2546 that extends longitudinally along the body 2512 spaced apart from the terminals 2540, 2542, 2544, and is substantially parallel to the longitudinal axis 2514. The electrical conductor 2546 is positioned to be adjacent to the terminals 2540, 2542 and 2544. At least three sections 2541, 2543, 2545 of the electrical conductor 2546 emerge from the body 2512 so as to be in physical contact with water and each of the at least three sections 2541, 2543, 2545 faces a respective terminal 2540, 2542, 2544. The distance between the each terminal 2540, 2542, 2544 and its respective section 2541, 2543, 2545 of the electrical conductor 2546 that faces the terminal 2540, 2542, 2544 is chosen as a function of the characteristics of the current injected into the electrical conductor 2530, 2532, 2534 so that at least part of the current may propagate from the terminal 2540, 2542, 2544 and its respective section 2541, 2543, 2545 of the electrical conductor 2546 when the terminal 2540, 2542, 2544 and its respective section of the electrical conductor 2546 are emerged in water.

In one embodiment, the section 2541, 2543, 2545 of the output electrical conductor 2546 that emerges from the body 2512 runs from the position $P_1$ to at least the position $P_3$ along the length of the body 2512.

Each terminal 2540, 2542, 2544 and its respective section 2541, 2543, 2545 of the output electrical conductor 2546 that faces the terminal 2540, 2542, 2544 forms an electrical switch that is open when no liquid is present between the terminal 2540, 2542, 2544 and its respective section 2541, 2543, 2545 of the output electrical conductor 2546 (thereby preventing any current to flow from the terminal 2540, 2542, 2544 and the output electrical conductor 2546) and that is closed when liquid is present between the terminal 2540, 2542, 2544 and its respective section of the output electrical conductor 2546 (thereby allowing an electrical current to flow from the terminal 2540, 2542, 2544 and the output electrical conductor 2546).

The electrical conductors 2530, 2532, 2534 and 2546 are part of an electrical circuit that corresponds to a sensing unit for sensing in this case three different levels of liquid, i.e. positions $P_1$, $P_2$ and $P_3$. The electrical circuit comprises at least one current generator for propagating a first electrical current having a first input intensity in the electrical conductor 2530, a second electrical current having a second input intensity in the electrical conductor 2532, and a third electrical current having a third input intensity in the electrical conductor 34. The electrical circuit further comprises an intensity sensor such as an ammeter for measuring the intensity of the current propagating in the electrical conductor 2546. A first predefined intensity or a first predefined intensity range is associated with the first branch of the electrical circuit comprising the electrical conductor 2530. A second predefined intensity or a second predefined intensity range (greater than the first predefined intensity or a first predefined intensity range) is associated with the second branch of the electrical circuit comprising the electrical conductor 2532. A third predefined intensity or a third predefined intensity range (greater than the first and second predefined intensities or the first and second predefined intensity ranges) is associated with the second branch of the electrical circuit comprising the electrical conductor 2532.

It should be understood that the apparatus 18 further comprises a control unit (not shown) for controlling the current generator in order to generate the three electrical currents. The control unit is in communication with the intensity sensor for receiving the measured intensity. The control unit comprises a database on which the first predefined intensity or the first predefined intensity range, the second predefined intensity or the second predefined intensity range and the third predefined intensity or the third predefined intensity range are stored as well as the first, second and third input intensities. The first, second and third intensities may be equal or different. The control unit is configured for comparing the measured intensity to the predefined intensities or the predefined intensity ranges in order to determine the level of liquid, as explained below.

The sensing unit comprising the electrical circuit operates as follows. When the current sensor detects no current, then the control unit determines that the level of liquid is below the position $P_1$. When water is present only between the terminal 2540 and the electrical conductor 2546, the first electrical current may flow from the terminal 2540 to the electrical conductor 2546 while no current flows between the terminals 2542 and 2544 and the electrical conductor 2546. The intensity sensor then detects the first electrical current and measures the intensity of the detected current. If the measured intensity substantially corresponds to the first predefined intensity or is contained within the first predefined intensity range, then the control unit determines that the level of water is located at or above the position $P_1$ while being located below the position $P_2$.

When water is present between the terminals 2540 and 2542 and the electrical conductor 2546 while no water is present between the terminal 2544 and the electrical conductor 2546, the first electrical current may flow from the terminal 2540 to the electrical conductor 2546 and the second electrical current may flow from the terminal 2542 to the electrical conductor 2546 while no current flows between the third terminal 2544 and the electrical conductor 2546. The intensity sensor then detects the first and second electrical currents and measures an intensity that substantially corresponds to the addition of the first and second intensities. If the measured intensity substantially corresponds to the second predefined intensity or is contained within the second predefined intensity range, then the control unit determines that the level of water is located at or above the position $P_2$ while being located below the position $P_3$.

When water is present between the three terminals 2540, 2542 and 2544 and the electrical conductor 2546, the first electrical current may flow from the terminal 2540 to the electrical conductor 2546, the second electrical current may flow from the terminal 2542 to the electrical conductor 2546, and the third electrical current may flow from the terminal 2544 to the electrical conductor 2546. The intensity sensor then detects the first, second and third electrical currents and measures an intensity that substantially corresponds to the addition of the first, second and third intensities. If the measured intensity substantially corresponds to the third predefined intensity or is contained within the third predefined intensity range, then the control unit determines that the level of water is located at or above the position $P_3$.

In one embodiment, the apparatus 18 may further comprise a temperature sensor 2550 for monitoring the temperature of the liquid contained in the container. The temperature sensor 2550 is secured to the body 2512 and may be located adjacent to the bottom end 16 of the body 2512.

In one embodiment, the apparatus 18 may further comprise a communication unit (not shown) such as a wireless communication unit or a wire communication unit for at least transmitting signals. The control unit is in communication with the sensor unit comprising the sensors 2520, 2522 and 2524 to receive signals indicative of the detected level of liquid and to the temperature sensor 2550, if any. The controller may then send via the communication unit a signal indicative of the detected level of liquid and a signal indicative of the measured temperature. For example, the control unit may wirelessly send a signal indicative of the detected level and/or a signal indicative of the measured temperature to a mobile user device to inform a user of an actual level and/or temperature. In an embodiment in which the electrical conductor 34 and the terminal 2544 are positioned to correspond to the position of the overflow aperture of the container, the control unit may be adapted to generate and transmit an alert indicative of an overflow when it detects that water is present between the terminal 2544 and the electrical conductor 2546.

For example, such as an apparatus 18 may be used for an automatic bathtub provided with an electronic faucet for automatically filling water into the bathtub and an electronic drain closure device for automatically opening and closing the evacuation drain of the bathtub. In one embodiment, when an overflow is detected, i.e., when the control unit detects that water is present between the terminal 2544 and the electrical conductor 2546, the control unit is adapted to generate and transmit a first command signal indicative of an opening for the electronic drain closure device and/or a second command signal indicative of a closure for the electronic faucet. Upon receipt of the first command from the control unit, the electronic drain closure device opens so that water may flow through the evacuation drain. Upon receipt of the second command from the control unit, the electronic faucet closes so that water be no longer dispensed.

In one embodiment, the control unit of the apparatus 18 may be adapted to control the electronic faucet and/or the electronic drain closure system. In this case, a user may transmit a desired level of water for the bathtub and the control unit automatically controls the electronic drain control device to close the evacuation drain and the electronic faucet to opens the electronic faucet in order to fill the bathtub with water. The control unit then continuously or periodically monitors the level of water within the bathtub via the sensors 2520, 2522 and 2524. When it detects that the desired level of water is reached, the control unit closes the electronic faucet. The control unit may then transmit an alert to the user device or triggers a visual or sound alarm.

In an embodiment in which the apparatus 18 further comprises the temperature sensor 2550, the user may transmit a signal indicative of a desired temperature for the water to the control unit. In this case, the control unit is adapted to control the mixing valve connected to a source of hot water and a source of cold water to provide water having the desired temperature in addition to control the flow control valve of the electronic faucet in order to open the electronic faucet and deliver water having the desired temperature. In one embodiment, the control unit is adapted to transmit the measured temperature to the user device. In one embodiment the control unit is adapted to maintain the water contained in the bathtub to a the desired temperature. When it determines that the measured temperature no longer corresponds to the desired temperature, the control unit is adapted to open the electronic drain closure device in order to evacuate water via the evacuation drain and open the electronic faucet and control the mixing valve to add water having an adequate temperature until the measured temperature corresponds to the desired temperature. When the measured temperature corresponds to the desired temperature, the control unit closes the electronic drain closure device and the electronic faucet.

Figure 22:
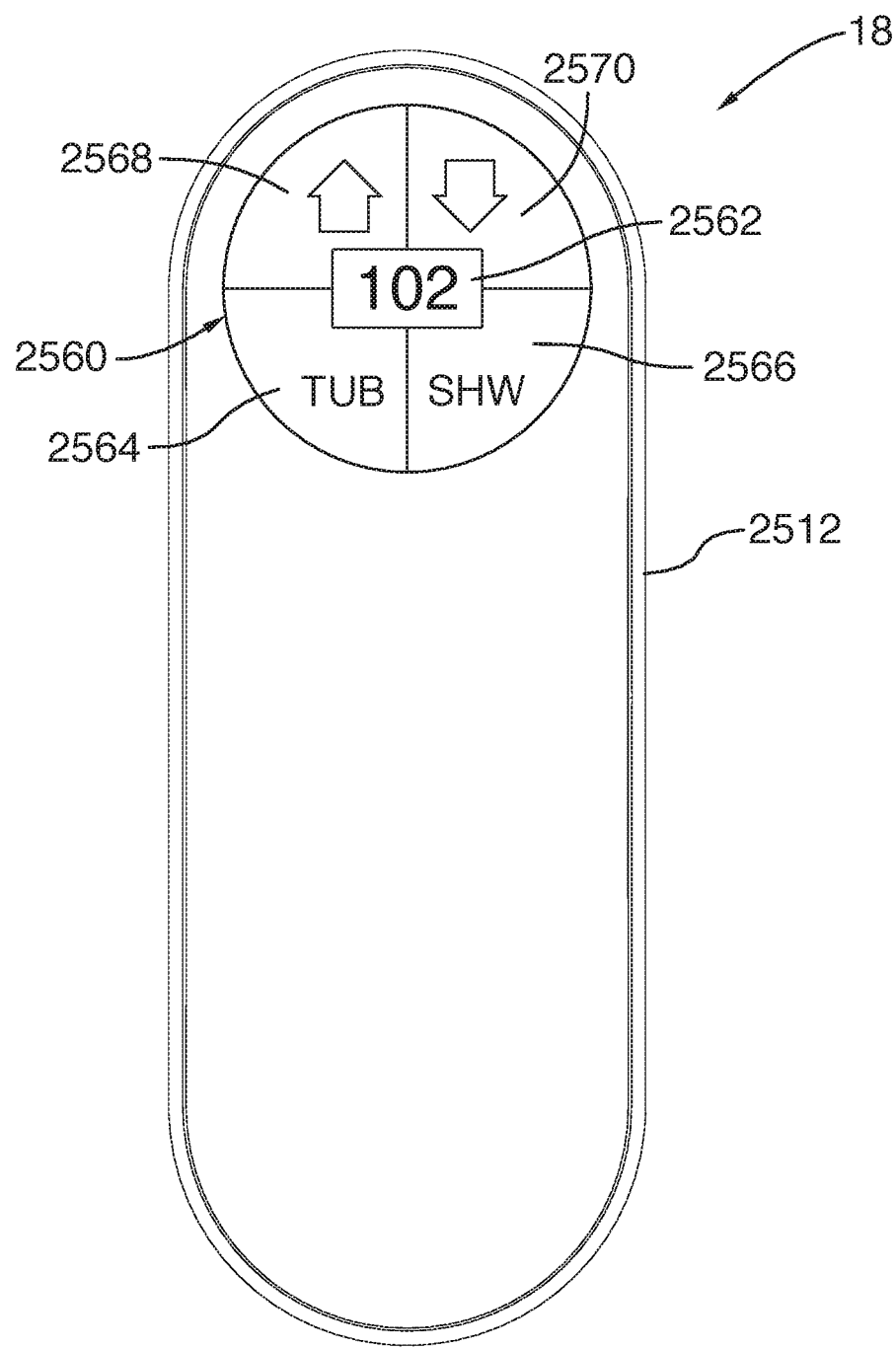
FIG. 22 is a front view of the apparatus of FIG. 1, in accordance with an embodiment.

In one embodiment, the apparatus 18 further comprises a control panel or user interface 2560 which may be located on the front face of the body 2512 while the level sensors 2520, 2522 and 2524 and the temperature sensor 2550, if any, are located on the rear face of the body 2512, as illustrated in FIG. 22. The control panel 2560 is connected to the control unit and may be used for controlling the automatic bathtub. For example, the control panel 2560 may be used to automatically fill a bathtub with water. Via the control panel 2560, the user may input a desired temperature for water, select a bathtub or shower mode, input a desired level of water for the bathtub, and/or the like. The control panel 2560 may also be used for manually activating the electronic faucet or the shower head.

In the illustrated embodiment, the control panel 2560 comprises a central display 2562 for displaying information such as a desired water temperature or an actual temperature, a tub activation key 2564 for activating the electronic faucet and close the electronic drain, a shower activation key 2566 for activating the shower head, a first selection key 2568, and a second selection key 2570. For example, the first and second selection keys 2568 and 2570 may be used for selecting different operation modes. For example, the keys 2568 and 2570 may be used to select a desired level of water for the bathtub. In another example, the keys 2568 and 2570 may be used to input a desired temperature. It should be understood that the control panel 2560 may comprise a touchscreen for allowing the user to input commands.

Figure 23:
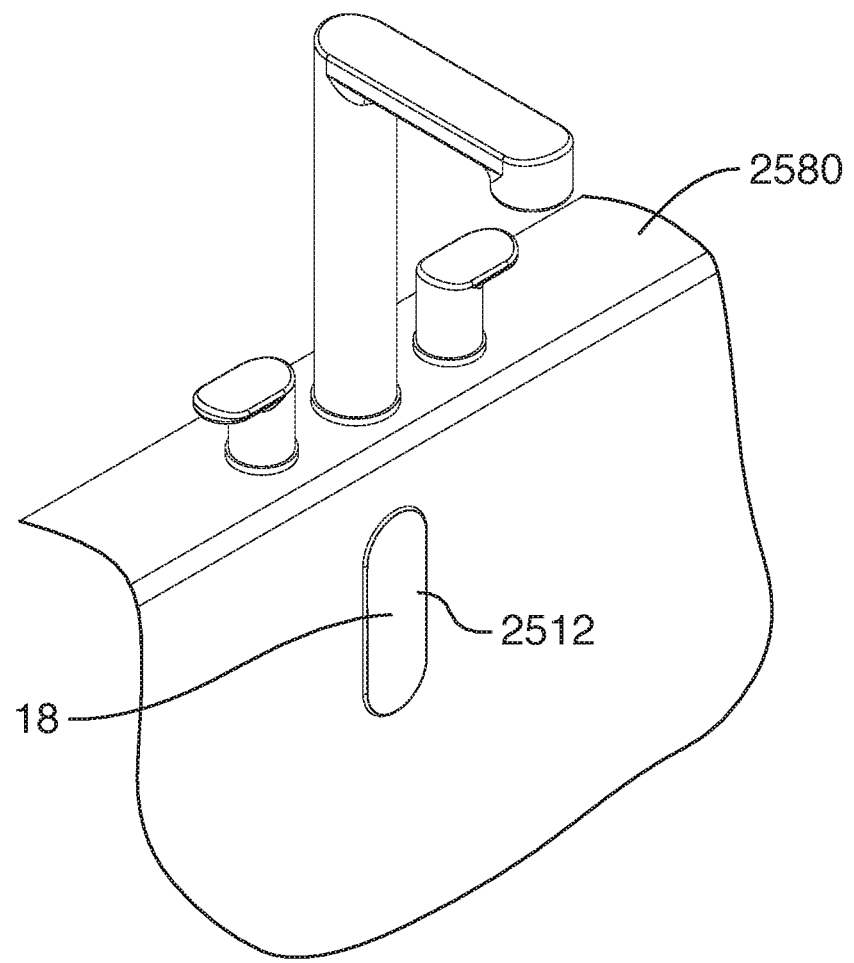
FIG. 23 illustrates an apparatus for determining the level of a liquid secured to a bathtub, in accordance with an embodiment.

FIG. 23 illustrates an exemplary apparatus 18 secured to a bathtub 2580. In this embodiment, the apparatus 18 is secured over an overflow aperture (not shown) present on the wall of the bathtub 2580 and connected to an overflow drain (not shown). In this case, the plate 2512 of the apparatus 18 corresponds to an overflow plate and is secured to the bathtub over the overflow aperture so that a gap exists between the wall of the bathtub 2580 and the rear face of the plate 2512 on which the level sensors 2520, 2522 and 2524 and the temperature sensor 2550, if any, are secured. The gap allows water to flow into the overflow aperture and to be in physical contact with the sensors 2520, 2522, 2524 and 2550. It should be understood that the body 2512 is secured to the wall of the bathtub 2580 so that it extends along the height of the bathtub 2580. In one embodiment, the overflow plate has a length along its longitudinal axis that is greater than the length of usual overflow plates.

Figure 24:
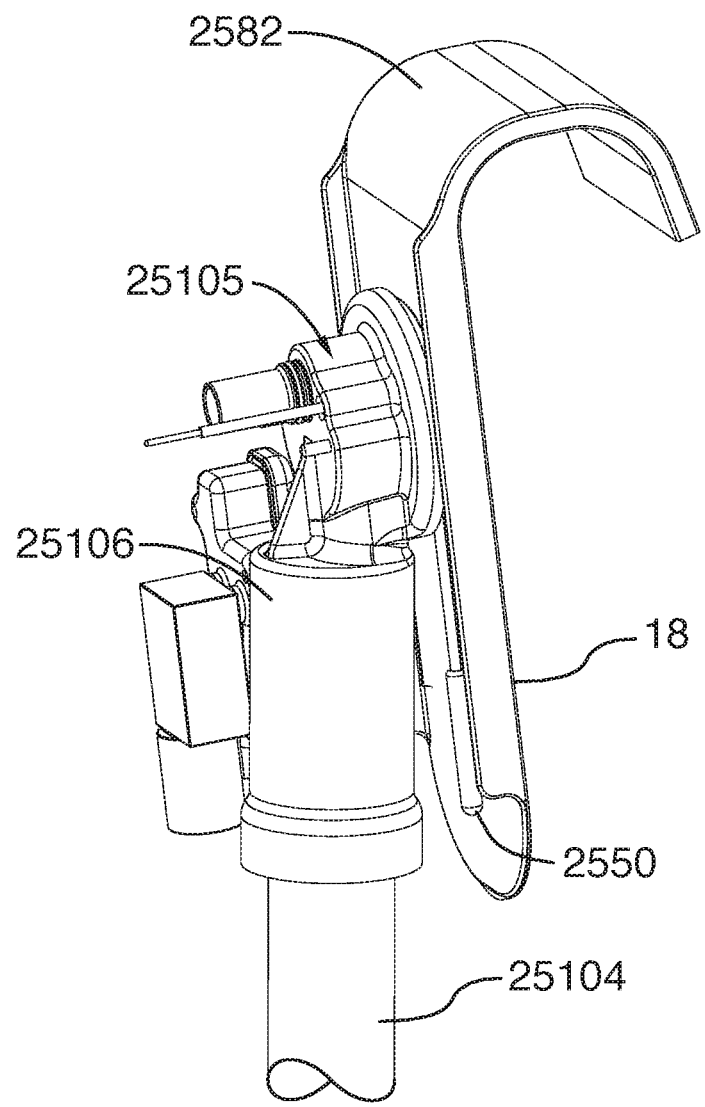
FIG. 24 illustrates an apparatus for determining the level of a liquid secured to a faucet, in accordance with an embodiment.

FIG. 24 illustrates an exemplary apparatus 18 secured to a faucet 2582. The body 2512 of the apparatus 18 extends downwardly from the faucet 2582 and the assembly comprising the faucet 2582 and the apparatus 18 is secured to the wall of a bathtub so that water way be in physical contact with the sensors 2520, 2522, 2524 and 2550 positioned on the rear face of the apparatus 18.

In an embodiment in which one of the sensor 2520, 2522, 2524, such as the sensor 2524, is positioned so as to be aligned with an overflow aperture of the container, such as at position $P_3$, the apparatus 18 may be adapted to trigger an alarm when the sensor detects water at the level of the overflow aperture. In the same or another embodiment, the apparatus 18 may be adapted to a send a signal indicative of the potential overflow. In a further embodiment, the apparatus 18 may be adapted to send a command to the electronic faucet to close the faucet and/or a command to the electronic drain to open the drain.

While in the illustrated embodiment, the apparatus 18 is securable to the bathtub, it should be understood that other embodiment may be possible. For example, the apparatus 18 may be a remote control that may be insertable into a container such as a bathtub and may float in a liquid such as water.

While in the illustrated embodiment, the control unit and the communication unit are integrated in the apparatus 18, it should be understood that other configurations may be possible. For example, the control unit and the communication unit may be independent from the body 2512 while the control unit is in communication with the sensors 2520, 2522, 2524 and 2550. For instance, the control unit could be mounted to an external wall of the tub 12.

Figure 25:
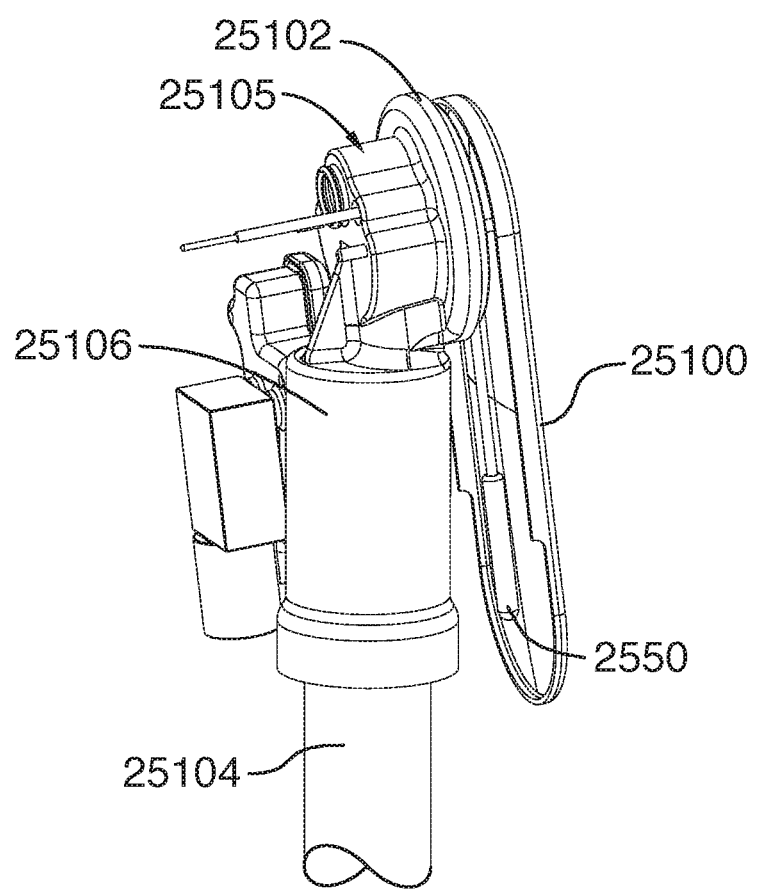
FIG. 25 is a side perspective of an apparatus for determining the level of a liquid contained in a container, the apparatus being secured to an overflow plate, in accordance with an embodiment.
Figure 26:
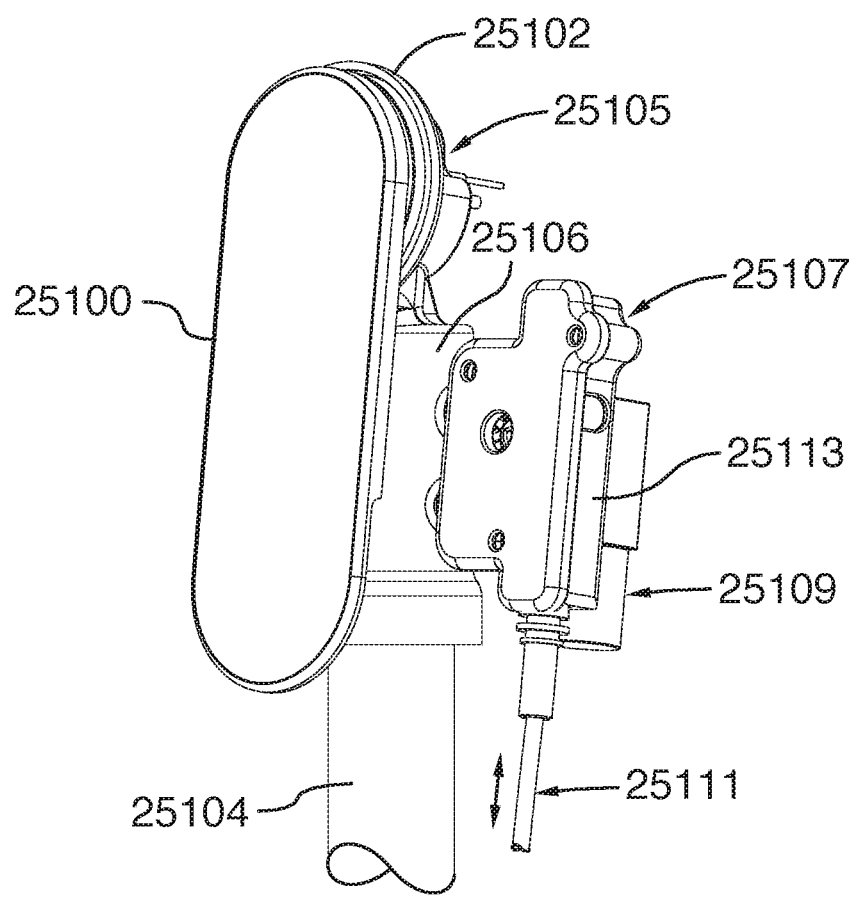
FIG. 26 is a front perspective view of the apparatus of FIG. 25 secured to the overflow plate.

FIGS. 25 and 26 illustrate an embodiment of an apparatus 25100 for determining the level of liquid contained in a container that is secured to an overflow plate 25102. The overflow plate 25102 is fluidly connected to an overflow drain 25104 via an elbow connector 25105 in order to evacuate water from the container when the level of water has reached a predefined level, i.e. the overflow level. Adjacent to the elbow connector 25105 is a rack and pinion transmission 25107 operatively coupled to an electric motor 25109. Extending from the transmission 25107, and operatively coupled to the drain closure system (e.g. drain closure system 16) is a cable 25111. As the electric motor 25109 is operated in one direction or the other, the transmission 25107 urges the cable 25111 to translate inwardly and outwardly from a transmission housing 25113, which causes the drain closure system to move between an open position and a closed position.

Figure 27:
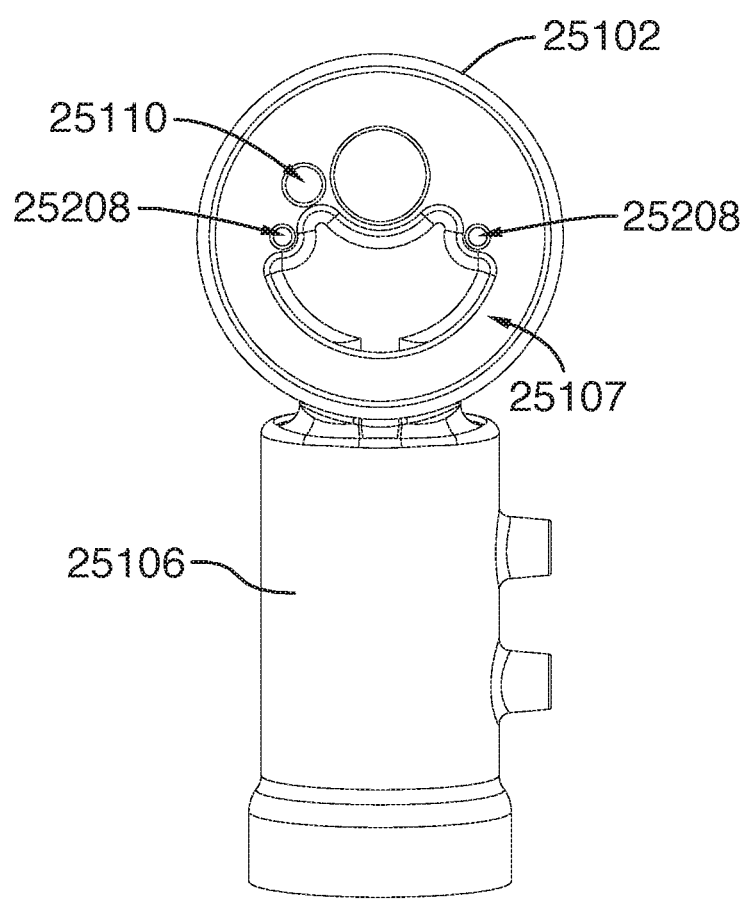
FIG. 27 is a front view of an overflow plate adapted to a have an apparatus for determining the level of a liquid contained in a container secured thereto, in accordance with an embodiment.

FIG. 27 illustrates one embodiment of the overflow plate 25102 to which the apparatus 25100 is secured. A chamber 25106 extends from the front face of the overflow plate 25102. The chamber 25106 is fluidly connected to the overflow drain 25104 via the elbow connector 25105 in order to evacuate overflow water. The overflow plate 25102 is further provided with a pair of securing holes 25108 which each extend from the front face of the overflow plate 25102. The securing holes 25108 are sized and shaped to receive therein securing means such as screws in order to secure the apparatus 25100 to the overflow plate 25102.

In an embodiment, in which the control unit is independent from the body of the apparatus 25100, the overflow plate 25102 further comprises apertures 25110. Communication cables may then be inserted through the apertures 25110 to connect the sensors 2520, 2522, 2524 and 2550 mounted on the apparatus 25100 to the control unit.

It should be understood that the control unit, the memory and the communication unit may be inserted into the casing 2512.

While the above-described sensing unit comprises three input electrical conductors 2530, 2532 and 2534 and a single output electrical conductor 2546, it should be understood that other configurations may be possible. For example, the sensing unit may comprise the three input electrical conductors 2530, 2532 and 2534 and three output electrical conductors each associated with a respective input electrical conductors 2530, 2532, 2534 so that the terminal of each output electrical conductor faces the terminal 2540, 2542, 2544 of its respective input electrical conductors 2530, 2532, 2534. In this case, the sensing unit further comprises three current sensor each connected to a respective input electrical conductors 2530, 2532, 2534 and its associated output electrical conductor to measure the respective current flowing therethrough. In this case, a current is injected in each input electrical conductor 2530, 2532, 2534 and when water is present between the terminal 2540, 2542, 2544 and the terminal of its respective output electrical conductor, the current may flow from the input electrical conductors 2530, 2532, 2534 to its respective output electrical conductor. For example, if water is present only between the terminal 2540 and the terminal of its respective output electrical conductor, the current sensor associated with the input electrical conductor 2530 detects a current while the other two current sensors associated with the input electrical conductors 2532 and 2534 detects not current. In this case, the control unit compares the intensity measured by the current sensor associated with the input electrical conductor 2530 to a predefined intensity or a predefined intensity range and if the comparison is positive, the control unit determines that the level of liquid is at or above the position $P_1$ while being below the position $P_2$.

In one embodiment, an electronic shower head is further included in the system 10. An electronic shower head is a shower head that can automatically deliver water without any human intervention. The operation of the electronic shower head is controlled by a controller such as controller 20. In this case, the electronic shower head and the electronic faucet 14 are both connected to a flow control valve which is also connected to the mixing valve. The flow control valve receives a flow of water from the mixing valve and selectively directs the flow of water towards the electronic shower head or the electronic faucet.

In one embodiment, the system 10 further comprises a temperature sensor for monitoring the temperature of the water contained within the bathtub 12. In one embodiment, the temperature sensor may be a contact temperature sensor, i.e., a temperature sensor adapted to measure the temperature of a liquid when in contact with the liquid. In another embodiment, the temperature sensor may be a contactless temperature sensor, i.e., a temperature sensor adapted to remotely measure the temperature of a liquid without being in contact with the liquid. For example, a contactless temperature sensor may be an infrared temperature sensor.

It should be understood that the different components of the system 10 such as electronic faucet 14, the electronic drain closure device 16 and the level sensor 18 are powered by at least one power source. For example, the electronic faucet 14, the electronic drain closure device 16 and the level sensor 18 may be electrically connected to a power grid. In another example, at least one battery may be used for powering the electronic faucet 14, the electronic drain closure device 16 and the level sensor 18. For example, each component may be powered by a respective battery such as a rechargeable battery.

The control unit 20 is adapted to control at least the electronic faucet and the electronic drain closure device 16. The control unit 20 is in communication with the electronic faucet 14, the electronic drain closure device 16 and the level sensor 18. For example, wireless communication may be used for allowing the control unit 20 to communicate with the electronic faucet 14, the electronic drain closure device 16 and the level sensor 18. Alternatively, the control unit 20 could be adapted to communicate with the electronic faucet 14, the electronic drain closure device 16 and the level sensor 18 through wires or electric cables.

The control unit 20 is adapted to control the electronic faucet 14, i.e. to control the mixing valve and the flow control valve, if any, comprised within the electronic faucet. The control unit 20 is adapted to adjust the mixing valve to adjust the flow of water and/or the temperature of water. The control unit 20 is further adapted to control the flow control valve, if any, to allow a flow of water from the electronic faucet 12 or from the shower head, if any.

The control unit 20 is also adapted to control the opening and closing of the electronic drain closure device 16 in order to respectively open and close the evacuation drain.

In one embodiment, the control unit 20 is further adapted to receive the level of water contained within the bathtub 12 from the level sensor 18.

In an embodiment in which the system 10 is provided with a temperature sensor for monitoring the temperature of the water contained within the bathtub 12, the control unit 20 is further adapted to receive the measured temperature from the temperature sensor.

In one embodiment, the control unit 20 may comprise or be connected to a user interface to allow a user inputting commands. In the same or another embodiment, the control unit 20 is in communication with a remote input device used by the user to input commands. In this case, the control unit 20 receives commands from the remote control and controls the system 10 according to the received commands. In one embodiment, the controller 20 and the input device communicate together via wireless communications. In this case, the input device may be a remote control, a mobile device provided with an adequate application, such as a mobile phone, a tablet, etc. In another embodiment, the controller 20 and the input device are connected via a communication wire. In this case, the input device may be secured adjacent to the bathtub such as on a wall.

Figure 28:
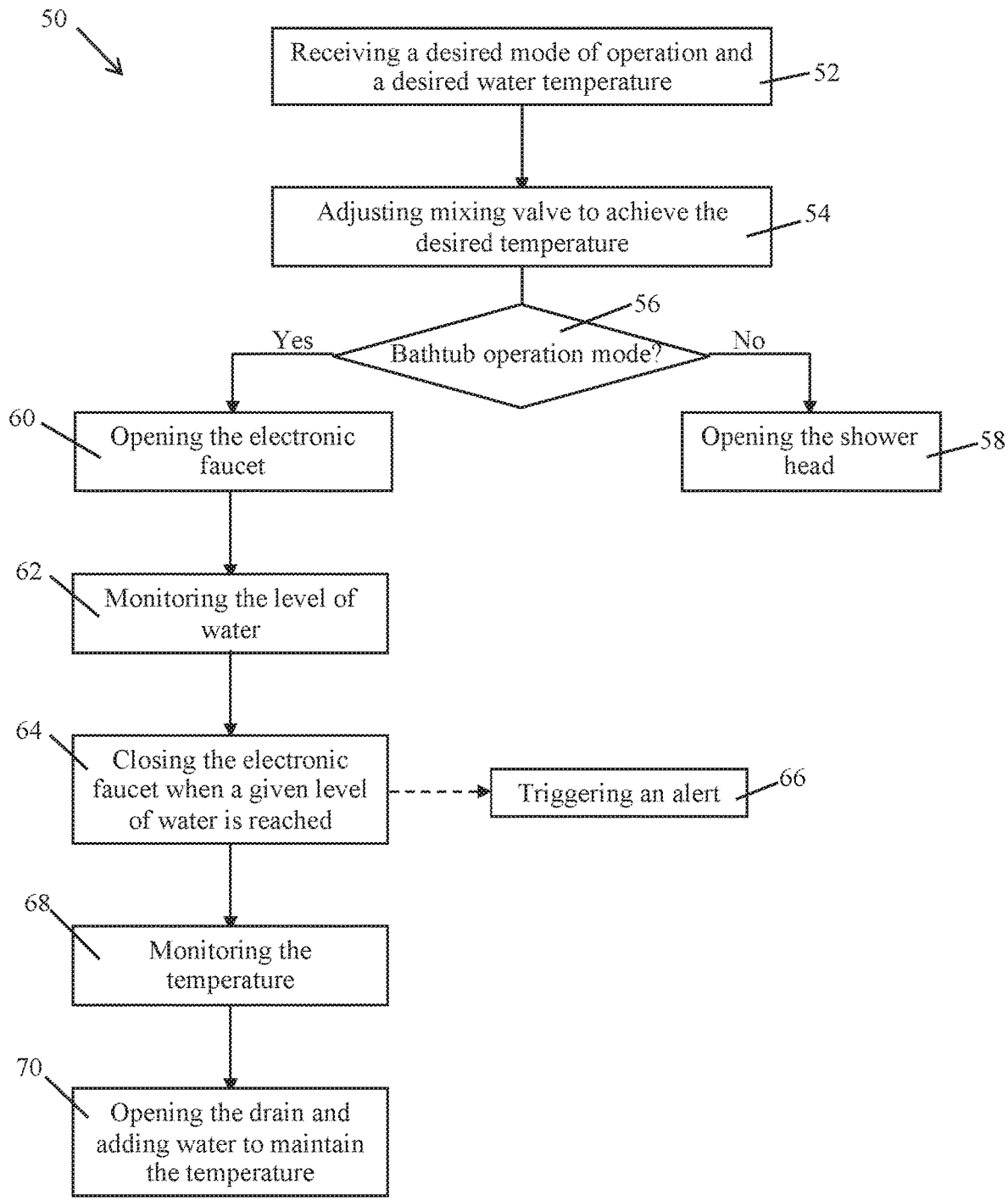
FIG. 28 is a flow chart illustrating a method for controlling an automated water delivery system, in accordance with an embodiment.

FIG. 28 illustrates one embodiment of a control method 50 to be applied by the control unit 20 in order to control the water delivery system 10.

At step 52, the control unit 20 receives a command signal indicative of desired settings for the water delivery system 10. For example, the commands may be indicative of a desired temperature for the water, a desired level of water, a desired flow rate, a desired mode of operation, i.e. delivery of water via the shower head or the bathtub faucet, and/or the like. The command signal is sent from the input device used by the user to input the desired settings.

At step 54, the control unit 20 adjusts the mixing valve so as to deliver water having the desired temperature.

In one embodiment, the control unit 20 comprises a database containing mixing valve setting conditions for different water temperatures. In this case, upon receiving the desired temperature, the controller 20 retrieves from the database the mixing valve setting conditions that correspond to the received desired temperature and applies the retrieved mixing valve setting conditions to the mixing valve in order to obtain water having the desired temperature.

In another embodiment in which the mixing valve, the faucet or the shower head, if any, is provided with a temperature sensor, the controller may apply a feedback loop control method to obtain the desired temperature. In this case, the controller 20 receives the temperature measured by the temperature sensor and adjusts the mixing valve setting conditions until the desired temperature is obtained.

In one embodiment, the control unit 20 directly controls the mixing valve. In another embodiment, the electronic faucet 14 is provided with a controller that controls the mixing valve and may also be provided with a temperature sensor for monitoring the temperature of the water to be delivered by the faucet. In this case, the control unit 20 transmits the desired temperature to the electronic faucet 14 and the controller of the electronic faucet 14 adjusts the mixing valve setting conditions to provide water having the desired temperature. As for the controller 20, the controller of the faucet may access a database for determining the mixing valve setting conditions or apply a control feedback loop using the temperature measured at the output of the mixing valve to adjust the mixing valve setting conditions and obtain the desired temperature.

At step 56, the control unit determines which one of the electronic faucet 14 and the shower head should deliver water according to the received mode of operation. If the received mode of operation indicates that the user wants to take a shower, the control unit 20 adjusts the flow control valve so that water be delivered by the shower head (step 58).

If the received mode of operation indicates that the user wants to take a bath, the control unit 20 adjusts the flow control valve so that water be delivered by the electronic faucet 14 and further closes the electronic drain closure device 16 to close the evacuation drain of the bathtub 12 and fill the bathtub 12 with water (step 60). In one embodiment, the closure of the electronic drain closure device 16 may occur prior to the adjustment of the flow control valve, i.e., prior to the delivery of water by the electronic faucet 14. In another embodiment, the closure of the electronic drain closure device 16 and the delivery of water by the electronic faucet 12 may occur concurrently. In a further embodiment, the closure of the electronic drain closure device 16 occurs after the delivery of water by the electronic faucet 12. In an example in which the electronic faucet or the mixing valve is provided with a temperature sensor and the controller 20 uses a feedback loop control method, the closing of the electronic drain closure device 16 may occur only when the temperature sensor of the electronic faucet 12 or the mixing valve indicates that the temperature of the water delivered by the faucet has reached the desired temperature.

It should be understood that steps 56 and 58 may be omitted if the system 10 comprises no shower head. In this case, the commands received at step 52 comprise no desired mode of operation.

At step 62, the control unit 20 receives the level of water within the bathtub 12 monitored by the level sensor 18. When the received and measured level of water corresponds to the desired level received at step 52, the control unit 20 closes the electronic faucet 14 by adjusting the mixing valve so that water no longer flows from the electronic faucet. For example, if the user inputted a low level of water, the control unit 20 closes the electronic faucet 14 when the level sensor 18 indicates that the low level is reached.

In an embodiment in which the commands received at step 52 indicate no desired level, the control unit 20 may be adapted to close the electronic faucet 14 when a predefined level is reached. In one embodiment, the predefined level may be the overflow level.

In one embodiment, the control unit 20 may be adapted to trigger an alert when the desired level or water is reached or upon closure of the electronic faucet. For example, the control unit 20 may be adapted to send an alert message to a mobile device to inform the user that the filling of bathtub 12 is completed. In the same or another embodiment, the control unit 20 may remotely activate an apparatus to inform the user. For example, the control unit 20 may be adapted to switch on a light or turn a media player to play music, a video, or the like.

Following step 66, the control unit 20 operates in a post-fill mode in which the temperature of the water contained within the bathtub 12 is monitored at step 68. The control unit 20 receives the temperature measured by the temperature sensor and compares the received temperature to the desired temperature. If the measured temperature does not correspond to the desired temperature or is not comprised within a given range around the desired temperature, the control unit 20 then opens the electronic drain closure device 16 to evacuate some water from the bathtub 12 and opens the electronic faucet 14 to add water into the bathtub 12, at step 70. In this case, the controller 20 receives substantially continuously the temperature measured by the temperature sensor and compares the received temperature to the desired temperature and keeps the mixing valve opened until the measured temperature substantially corresponds to the desired temperature.

If the measured temperature is less than the desired temperature, the control unit 20 controls the mixing valve of the electronic faucet 14 to add hot water. If the measured temperature is greater than the desired temperature, the control unit 20 controls the mixing valve of the electronic faucet 14 to add cold water.

In one embodiment, the control unit 20 opens the electronic drain closure device 16 for a first predefined period of time and then closes the electronic drain closure device 16 once the first predefined period of time elapsed. The control unit 20 also opens the mixing valve to deliver water through the electronic faucet 14 during a second predefined period of time. The opening of the mixing valve may occur concurrently with the opening of the electronic drain closure device 16 or after the closing of the electronic drain closure device 16. In one embodiment, the temperature of the water delivered by the electronic faucet 14 during the second predefined period of time corresponds to the desired temperature received at step 52. In another embodiment, the temperature of the water delivered by the electronic faucet 14 during the second predefined period of time is greater than the desired temperature if the measured temperature is less than the desired temperature. In a further embodiment, the temperature of the water delivered by the electronic faucet 14 during the second predefined period of time is less than the desired temperature if the measured temperature is greater than the desired temperature.

In one embodiment, the adjustment of the temperature is performed iteratively. The controller 20 opens the electronic drain closure device 16 during a first predefined period of time and opens the mixing valve during second predefined period to time while monitoring the temperature of the water contained in the bathtub 12.

If before the end of the first or second predefined period of time, it determines that the water contained in the bathtub 12 corresponds to the desired temperature, the controller 20 closes the mixing valve and the electronic drain closure device 16. If a desired level was specified in the user input and if the controller 20 determines that the level of water within the bathtub is below the desired level, the controller 20 then adjusts the mixing valve to deliver water having the desired temperature until the measured level of water in the bathtub 12 corresponds to the desired level.

If at the end of the second predefined period of time the measured temperature of the water within the bathtub 12 does not correspond to the desired temperature, the controller 20 then opens the electronic drain closure device 16 for a third predefined period of time and also controls the mixing valve to add water in the bathtub for a fourth predefined period of time. In one embodiment, the third and fourth predefined period s of time may be substantially equal to the first and second predefined periods of time, respectively, be shorter than the first and second predefined periods of time, respectively, or be longer than the first and second predefined periods of time, respectively. It should be understood that if before the end of the third or fourth predefined period of time, it determines that the water contained in the bathtub 12 corresponds to the desired temperature, the controller 20 closes the mixing valve and the electronic drain closure device 16. If a desired level was specified in the user input and if the controller 20 determines that the level of water within the bathtub is below the desired level, the controller 20 then adjusts the mixing valve to deliver water having the desired temperature until the measured level of water in the bathtub 12 corresponds to the desired level.

The steps of opening of the electronic drain closure device 16 and opening of the mixing valve may be repeated until the temperature within the bathtub 12 corresponds to the desired temperature. It should be understood that a tolerance may be given when comparing the measured temperature to the desired temperature in order to determine if the measured corresponds to the desired temperature. For example, the controller 20 may consider that the desired temperature has been reached if the measured temperature is within a given range around the desired temperature.

In one embodiment, the flow rate of water exiting the evacuation drain via the electronic drain closure device 16 is known. In this case, the control unit 20 may determine the volume of water that was evacuated during the first predefined period of time during which the electronic drain closure device 16 is opened. The control unit 20 may then adjust the flow rate of the water delivered by the electronic faucet 14 during the second predefined period of time so that the volume of added water substantially corresponds to the volume of evacuated water.

In one embodiment, the commands received at step 52 comprise a desired flow of water for the shower head or the faucet 14 for example. In this case, the system 10 further comprises a flow meter positioned downstream of the flow control valve to monitor the flow of water. The control unit 20 is adapted to receive the measured flow of water from the flow meter and adjust the mixing valve and/or the flow control valve so that the flow of water flowing from the flow control valve corresponds to the desired flow of water.

It should be understood that the order in which the steps of the method 50 are performed is exemplary only and may be changed.

While the present description refers to a water delivery system comprising a bathtub, it should be understood that the above described control unit 20 and control method 50 may be used for controlling any adequate delivery system for delivering a liquid in any adequate container.

In one embodiment, the control unit 20 comprises at least one processing unit or processor, a memory or storing unit for storing data, and a communication unit for receiving and transmitting data.

In one embodiment, the control unit 20 is adapted to monitor water consumption and provide the user with reports about the water consumption. The control unit 20 may be adapted to send notifications and alerts to mobile devices for example. The control unit 20 may also be adapted to operate with equipment connected to a home automation network.

In one embodiment, the control unit 20 may allow the user to input pre-set settings and scheduling. The control unit 20 may also be adapted to learn and anticipate user preferences.

Figure 29:
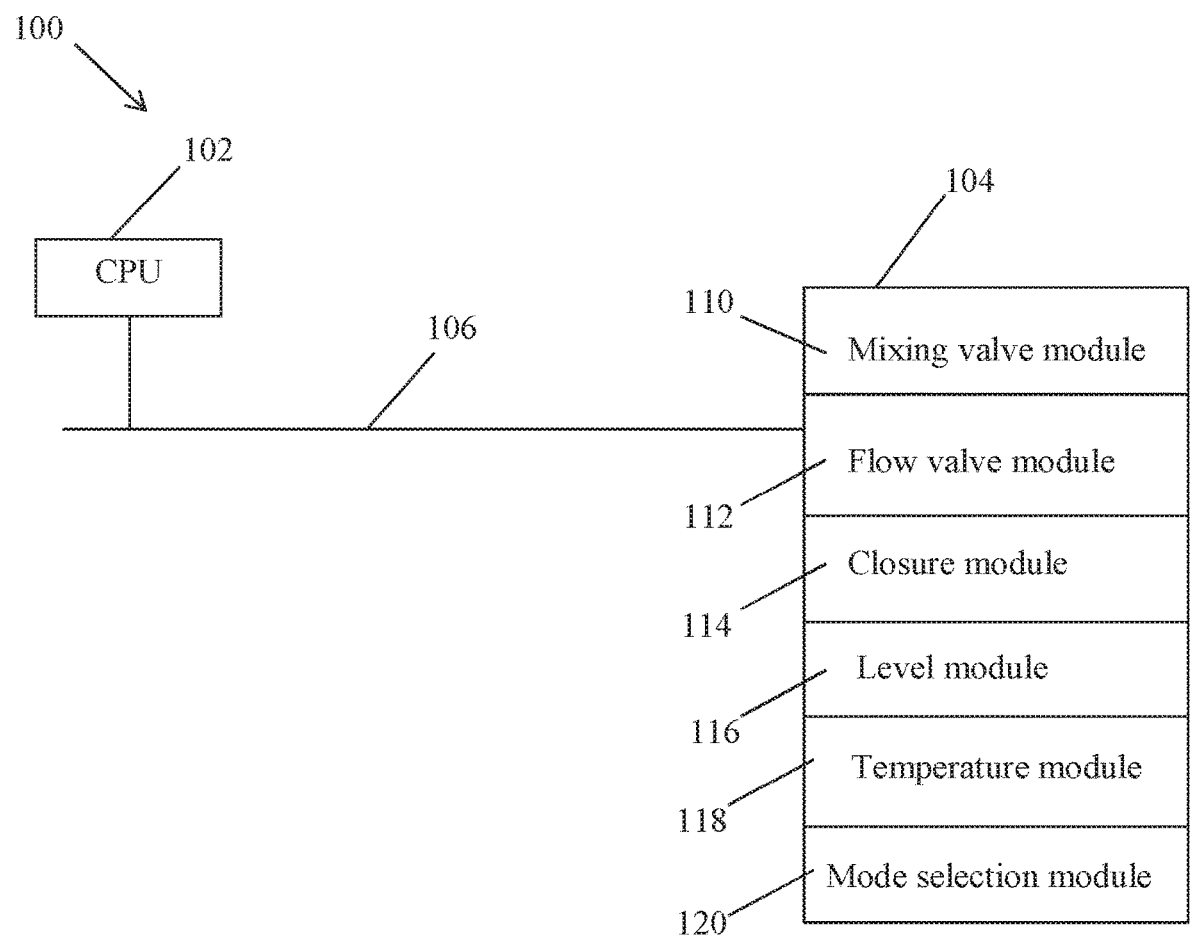
FIG. 29 is a block diagram illustrating a controller for controlling a water delivery system, in accordance with an embodiment.

FIG. 29 is a block diagram illustrating an exemplary controller 100 for controlling the water delivery system 10, in accordance with some embodiments. The processing module 100 typically includes one or more Computer Processing Units (CPUs) or Graphic Processing Units (GPUs) 102 for executing modules or programs and/or instructions stored in memory 104 and thereby performing processing operations, memory 104, and one or more communication buses 106 for interconnecting these components. The communication buses 106 optionally include circuitry (sometimes called a chipset) that interconnects and controls communications between system components. The memory 104 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 104 optionally includes one or more storage devices remotely located from the CPU(s) 102. The memory 104, or alternately the non-volatile memory device(s) within the memory 104, comprises a non-transitory computer readable storage medium. In some embodiments, the memory 104, or the computer readable storage medium of the memory 104 stores the following programs, modules, and data structures, or a subset thereof:

a mixing valve module 110 for controlling the operation of the mixing valve;

a flow valve module 112 for controlling the operation of the mixing valve;

a closure module 114 for selectively opening and closing the electronic drain closure device 16;

a level module 116 for determining if a desired level has been reached;

a temperature module 118 for determining if a desired temperature has been reached; and a mode selection module 120 for determining whether water should be delivered via the electronic faucet 14 or the shower head.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, the memory 104 may store a subset of the modules and data structures identified above. Furthermore, the memory 104 may store additional modules and data structures not described above.

Although FIG. 29 shows a processing module 100, FIG. 3 is intended more as functional description of the various features which may be present in a management module than as a structural schematic of the embodiments described herein. In practice, and as recognized by those of ordinary skill in the art, items shown separately could be combined and some items could be separated.

While the present description refers to a bathtub to be filled with water, it should be understood that the present system may be used for any container to be filled with any adequate liquid.

The embodiments of the invention described above are intended to be exemplary only. The scope of the invention is therefore intended to be limited solely by the scope of the appended claims.

We claim:

1. An automated liquid management system for a liquid container, the automated liquid management system comprising:

an electronic liquid delivery system positioned to deliver a liquid to the container, the electronic liquid delivery system including a mixing valve connected to a source of hot liquid and a source of cold liquid and a flow control valve connected to the mixing valve, the flow control valve controlling a flow of liquid coming from the mixing valve;

a drain closure device;

a level sensor for monitoring a level of liquid in the container, wherein the level sensor comprises a level sensor unit including at least one current source, an electrical circuit, and at least one current sensor for measuring at least one current intensity; and a controller operatively coupled to the electronic liquid delivery system, the drain closure device, and the level sensor, the controller comprising a processing unit;

a communication unit for communicating with the electronic liquid delivery system, the drain closure device, and the level sensor; and a memory, the memory including a database having at least one predefined current intensity or at least one predefined current intensity range and having statements and instructions stored on that upon execution by the processing unit performs the steps of:

receiving a desired temperature for the liquid to be delivered to the container and a desired level of liquid within the container;

adjusting the mixing valve connected to the source of hot liquid and the source of cold liquid to obtain the desired temperature;

operating the flow control valve for delivering the liquid having the desired temperature;

closing the drain closure device;

monitoring the level of the liquid within the container by comparing the at least one current intensity to the at least one predefined current intensity or at least one predefined current intensity range and determining the level of liquid based on the comparison; and closing the flow control valve of the electronic liquid delivery system when the monitored level of liquid substantially corresponds to the desired level of liquid.

2. The automated liquid management system of claim 1, further comprising a temperature sensor, the controller being operatively coupled to the temperature sensor, the communication unit further communicating with the temperature sensor, and the controller being further configured for monitoring a temperature of the liquid contained within the container.

3. The automated liquid management system of claim 2, wherein at least one of the electronic liquid delivery system, the drain closure device, the level sensor, the temperature sensor, and the controller is powered by a battery.

4. The automated liquid management system of claim 3, wherein the battery is a rechargeable battery.

5. The automated liquid management system of claim 4, wherein the automated liquid management system further comprises a solar panel for charging the rechargeable battery.

6. The automated liquid management system of claim 2, wherein at least one of the level sensor and the temperature sensor is mounted to the electronic liquid delivery system.

7. The automated liquid management system of claim 2, wherein the level sensor further comprises a body extending along a longitudinal axis, the body being insertable within the container, and wherein the level sensor unit is secured to the body.

8. The automated liquid management system of claim 7, wherein the body of the level sensor further comprises the temperature sensor for measuring a temperature of the liquid.

9. The automated liquid management system of claim 2, wherein the controller is further configured for opening the drain closure device of the container and opening the flow control valve to add liquid when the monitored temperature does not correspond to the desired temperature.

10. The automated liquid management system of claim 1, wherein the communication unit is a wireless communication unit.

11. The automated liquid management system of claim 10, wherein at least one of the level sensor and the temperature sensor is a contactless sensor.

12. The automated liquid management system of claim 1, wherein the electronic liquid delivery system further comprises:
- a housing defining an internal chamber, the housing comprising at least one delivery hole, wherein the mixing valve, the flow control valve and the controller are located within the internal chamber;
- at least one pipe located within the internal chamber and connected to the flow control valve for delivering the liquid coming from the flow control valve through the at least one delivery hole of the housing; and
- a cover securable to the housing for enclosing the flow control valve, the pipe, the controller within the internal chamber.

13. The automated liquid management system of claim 12, further comprising an activation key for activating the flow control valve.

14. The automated liquid management system of claim 13, wherein the activation key comprises one of a press button and a motion sensor.

15. The automated liquid management system of claim 1, wherein the drain closure device comprises:
- a drain fitting securable to an opening present in the liquid container and to an evacuation drain for evacuating the liquid to be contained in the liquid container; and
- a closure member movably connected to the drain fitting for selectively opening and closing the drain fitting, the closure member including:
  - a casing;
  - a motion device for selectively moving the casing relative to the drain fitting between an open position in which the casing is away from the drain fitting to allow the liquid to flow from the container into the evacuation drain and a closed position in which the casing abuts against the drain fitting to prevent the liquid from flowing from the container into the evacuation drain;
  - an electrical motor received in the casing for activating the motion device;
  - a communication unit received in the casing and operatively coupled to the communication unit of the controller for at least receiving a command indicative of one of an opening of the electronic drain closure system and a closure of the electronic drain closure system; and
  - a closure member controller for activating the electrical motor in accordance with the command received by the communication unit of the closure member.

16. The electronic drain closure system of claim 15, further comprising a battery received in the casing for powering at least the electrical motor and the closure member controller.

17. The automated liquid management system of claim 16, wherein the battery is a rechargeable battery.

18. The automated liquid management system of claim 17, the electronic drain closure system further comprising a solar panel installed on the casing for recharging the rechargeable battery.

19. The automated liquid management system of claim 1, wherein the container is a bathtub.

20. The automated liquid management system of claim 1, wherein the drain closure device further comprises a sensor for detecting the presence of a liquid, and wherein the communication unit of the drain closure device is only activated when the sensor detects the presence of liquid.

* * * * *